US012636581B2

(12) United States Patent
Zhang et al.

(10) Patent No.: US 12,636,581 B2
(45) Date of Patent: May 26, 2026

(54) DATA PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Jiaming Zhang, Shenzhen (CN); Yachang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 415 days.

(21) Appl. No.: 18/206,025

(22) Filed: Jun. 5, 2023

(65) Prior Publication Data

US 2024/0165513 A1     May 23, 2024

Related U.S. Application Data

(63) Continuation of application No. PCT/CN2022/132498, filed on Nov. 17, 2022.

(30) Foreign Application Priority Data

Feb. 18, 2022    (CN) .......................... 202210152301.0

(51) Int. Cl.
*A63F 13/35*          (2014.01)
*A63F 13/52*          (2014.01)
(Continued)

(52) U.S. Cl.
CPC .............. *A63F 13/55* (2014.09); *A63F 13/35* (2014.09); *A63F 13/52* (2014.09); *A63F 13/70* (2014.09)

(58) Field of Classification Search
CPC .......... A63F 13/55; A63F 13/35; A63F 13/52; A63F 13/70; A63F 13/355; A63F 13/358; A63F 13/77; A63F 2300/53; Y02D 10/00
(Continued)

(56) References Cited

U.S. PATENT DOCUMENTS 9,433,862 B2 *   9/2016  Bruno, Jr. ............. A63F 13/352
12,212,618 B2 *  1/2025  Di Girolamo ........ G06F 16/955
(Continued)

FOREIGN PATENT DOCUMENTS

CN            1848095 A      10/2006
CN          109254804 A       1/2019
(Continued)

OTHER PUBLICATIONS

Tencent Technology, WO+IPRP, PCT/CN2022/132498, Aug. 20, 2024, 4 pgs.
(Continued)

*Primary Examiner* — Michael A Cuff
(74) *Attorney, Agent, or Firm* — Morgan, Lewis & Bockius LLP

(57) ABSTRACT

This application provides a data processing method for a virtual scene performed by an electronic device, a non-transitory computer-readable storage medium. The method includes the following steps: enabling a plurality of clients to access a plurality of single games via a service process; allocating static resource masks corresponding to static resources of the service process to the plurality of clients, the static resource masks allocated to the plurality of clients being the same; allocating dynamic resource masks corresponding to dynamic resources of the service process to the plurality of clients; sharing the static resources among the plurality of single games based on the allocating static resource masks corresponding to the static resources to the (Continued)

plurality of clients; and isolating the dynamic resources among the different single games based on the allocating dynamic resource masks corresponding to the dynamic resources to the plurality of clients.

18 Claims, 20 Drawing Sheets

(51) Int. Cl.
*A63F 13/55* (2014.01)
*A63F 13/70* (2014.01)

(58) Field of Classification Search
USPC ........................................................... 463/31
See application file for complete search history.

(56) References Cited

U.S. PATENT DOCUMENTS

| | | | | |
|---|---|---|---|---|
| 2006/0143390 | A1 | 6/2006 | Kottapalli | |
| 2006/0288251 | A1 | 12/2006 | Jackson | |
| 2011/0201430 | A1* | 8/2011 | Maribona | G07F 17/32 |
| | | | | 463/42 |
| 2011/0296029 | A1 | 12/2011 | Jackson | |
| 2012/0309541 | A1* | 12/2012 | Kofman | G06Q 30/02 |
| | | | | 463/42 |
| 2013/0137494 | A1* | 5/2013 | Carroll | A63F 13/85 |
| | | | | 463/9 |
| 2013/0281203 | A1* | 10/2013 | Walker | G07F 17/3239 |
| | | | | 463/29 |
| 2014/0274362 | A1* | 9/2014 | Dhawan | A63F 13/798 |
| | | | | 463/29 |
| 2016/0093169 | A1* | 3/2016 | Orcutt | G07F 17/3225 |
| | | | | 463/13 |
| 2017/0113144 | A1* | 4/2017 | McDonald | G06Q 50/00 |
| 2018/0309636 | A1* | 10/2018 | Strom | H04L 43/08 |
| 2019/0020449 | A1* | 1/2019 | Borean | H04L 69/24 |
| 2020/0155934 | A1* | 5/2020 | Perry | A63F 13/77 |
| 2025/0224985 | A1* | 7/2025 | Di Girolamo | G06F 16/955 |

FOREIGN PATENT DOCUMENTS

| | | |
|---|---|---|
| CN | 110442454 A | 11/2019 |
| CN | 111949406 A | 11/2020 |
| CN | 112040264 A | 12/2020 |
| CN | 112190927 A | 1/2021 |
| CN | 113127134 A | 7/2021 |
| EP | 3936207 A1 | 1/2022 |
| JP | 2007260355 A | 10/2007 |
| JP | 2009233268 A | 10/2009 |
| JP | 2016002413 A | 1/2016 |
| JP | 5948476 B1 | 7/2016 |
| JP | 6270973 B1 | 1/2018 |
| JP | 2018110838 A | 7/2018 |
| JP | 2021079083 A | 5/2021 |
| JP | 2021087796 A | 6/2021 |

OTHER PUBLICATIONS

Tencent Technology, Japanese Office Action, JP Patent Application No. 2024-531229, May 16, 2025, 16 pgs.
Tencent Technology, ISR, PCT/CN2022/132498, Feb. 10, 2023, 3v pgs.
Tencent Technology, Japanese Office Action, JP Patent Application No. 2024-531229, Nov. 19, 2025.
Automaton-Media.com, Nobuya Sato, "Apex Legends-Apex Legends Kings Canyon", returns for a limited time starting tomorrow. The map structure will be the nostalgic one from before Season 1 began, Feb. 2020, Retrieved from the Internet: https://automaton-media.com/articles/newsjp/20200221-114488/.

* cited by examiner

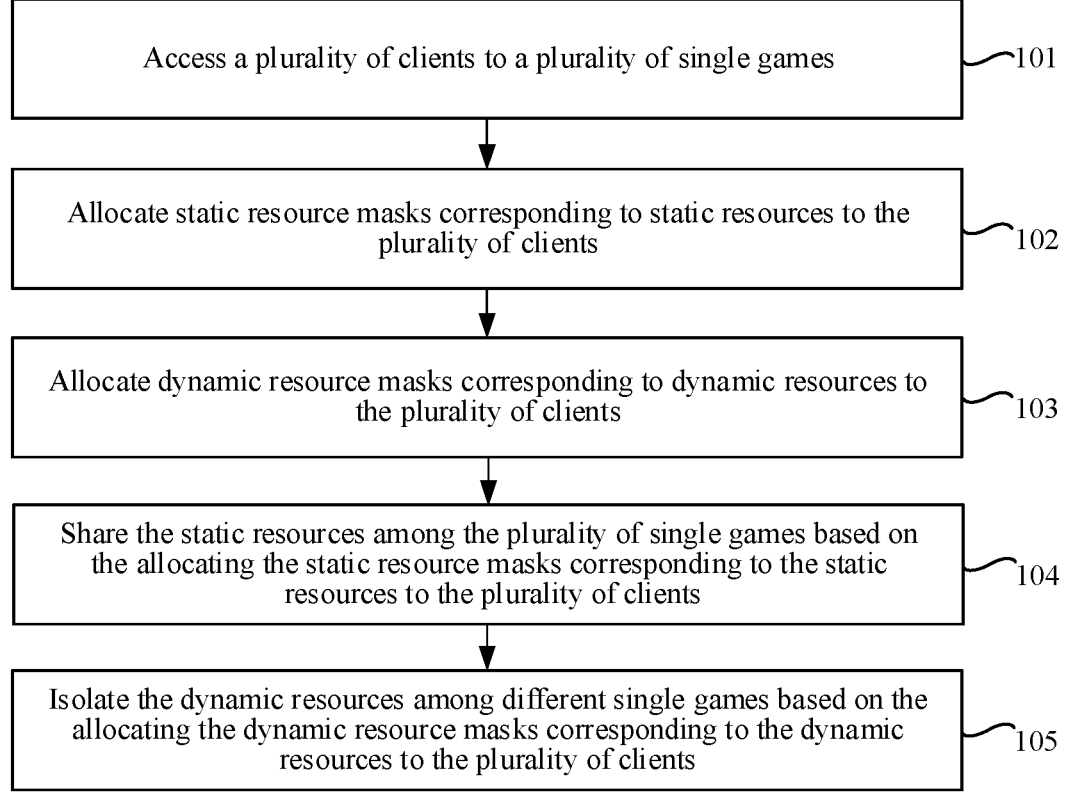

Access a plurality of clients to a plurality of single games 101

Allocate static resource masks corresponding to static resources to the plurality of clients 102

Allocate dynamic resource masks corresponding to dynamic resources to the plurality of clients 103

Share the static resources among the plurality of single games based on the allocating the static resource masks corresponding to the static resources to the plurality of clients 104

Isolate the dynamic resources among different single games based on the allocating the dynamic resource masks corresponding to the dynamic resources to the plurality of clients 105

FIG. 3A

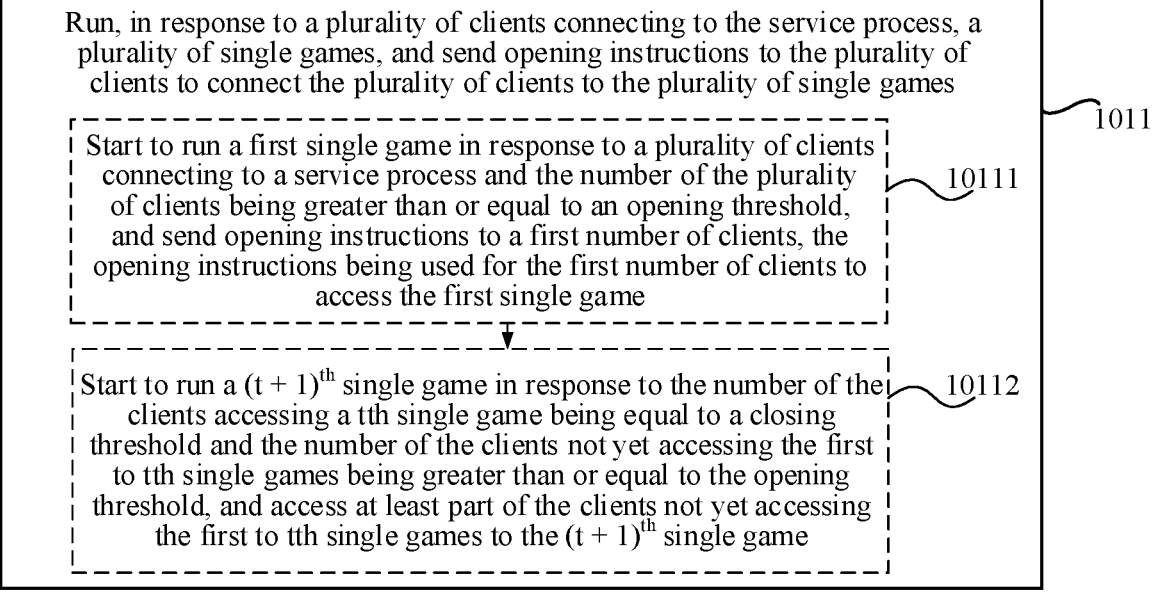

Run, in response to a plurality of clients connecting to the service process, a plurality of single games, and send opening instructions to the plurality of clients to connect the plurality of clients to the plurality of single games
1011

Start to run a first single game in response to a plurality of clients connecting to a service process and the number of the plurality of clients being greater than or equal to an opening threshold, and send opening instructions to a first number of clients, the opening instructions being used for the first number of clients to access the first single game
10111

Start to run a $(t + 1)^{th}$ single game in response to the number of the clients accessing a tth single game being equal to a closing threshold and the number of the clients not yet accessing the first to tth single games being greater than or equal to the opening threshold, and access at least part of the clients not yet accessing the first to tth single games to the $(t + 1)^{th}$ single game
10112

FIG. 3C

Determine, based on dynamic resource masks allocated to a first client, at least one second client accessing a same single game and having a same field of view as the first client
1053

Query, based on the dynamic resource masks assigned to the first client, the at least one client assigned same dynamic resource masks as the first client from a plurality of clients
10531

Determine a distance between dynamic resources currently displayed in the first client and dynamic resources corresponding to the at least one client in a virtual scene
10532

Take at least one client with a distance less than a visual field distance threshold as a second client
10533

FIG. 3D

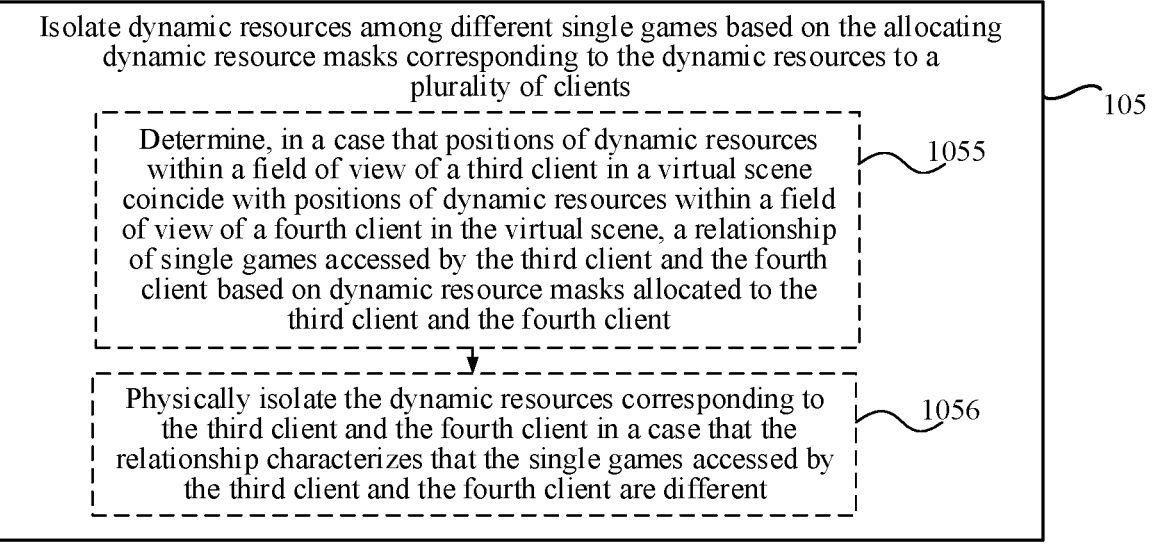

Isolate dynamic resources among different single games based on the allocating dynamic resource masks corresponding to the dynamic resources to a plurality of clients

~ 105

Determine, in a case that positions of dynamic resources within a field of view of a third client in a virtual scene coincide with positions of dynamic resources within a field of view of a fourth client in the virtual scene, a relationship of single games accessed by the third client and the fourth client based on dynamic resource masks allocated to the third client and the fourth client

1055

Physically isolate the dynamic resources corresponding to the third client and the fourth client in a case that the relationship characterizes that the single games accessed by the third client and the fourth client are different

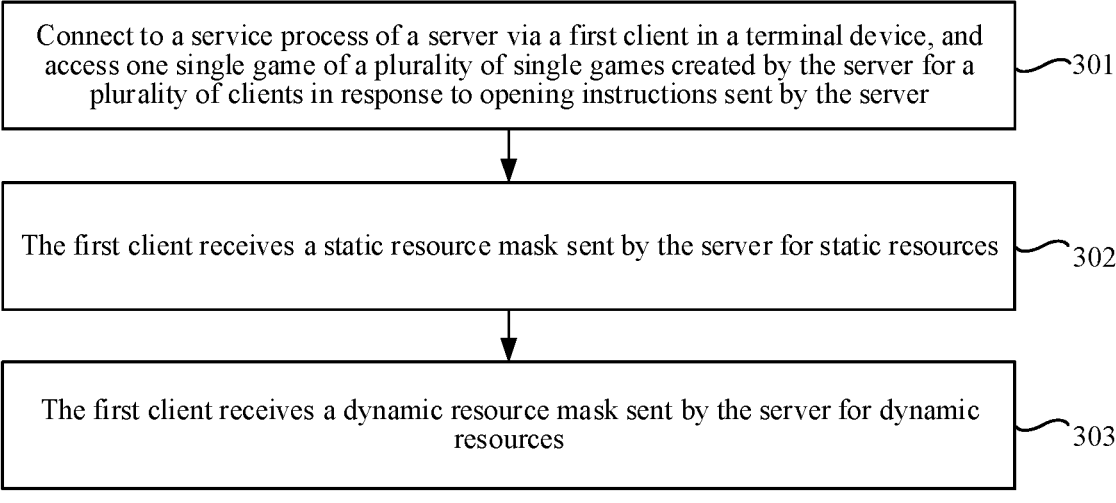

Connect to a service process of a server via a first client in a terminal device, and access one single game of a plurality of single games created by the server for a plurality of clients in response to opening instructions sent by the server ⟿301

The first client receives a static resource mask sent by the server for static resources ⟿302

The first client receives a dynamic resource mask sent by the server for dynamic resources ⟿303

FIG. 3G

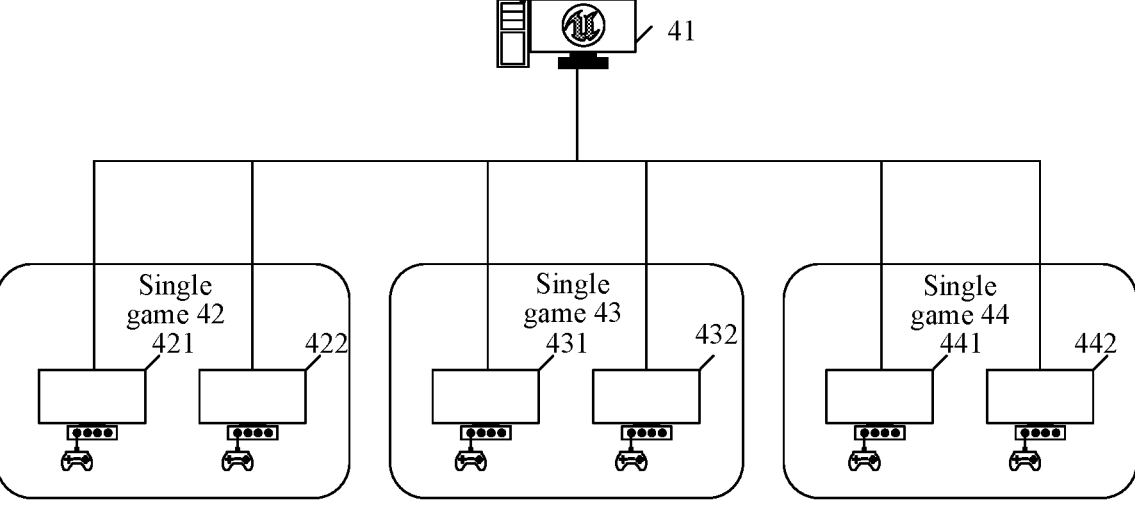

DATA PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/132498, entitled "DATA PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT" filed on Nov. 17, 2022, which is based on and claims priority to Chinese Patent Application No. 202210152301.0, entitled "DATA PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT" filed on Feb. 18, 2022, all of which is incorporated herein by reference in its entirety.

FIELD OF THE TECHNOLOGY

This application relates to the field of cloud technology, and in particular to, a data processing method and apparatus for a virtual scene, an electronic device, a non-transitory computer-readable storage medium, and a computer program product.

BACKGROUND OF THE DISCLOSURE

With the development of game technology, a server needs to provide resource services for large amounts of game clients at the same time, while different game clients will access different single games, and a service process provides resource services for game clients of each single game.

In the related art, each single game needs to correspondingly initiate a service process, and different single games correspond to different service processes, to realize dynamic resource isolation among different single games. This would result in the number of service processes being equal to the number of single games, and then large amounts of single games would correspondingly initiate the same number of service processes. Since the size of the memory occupied by static resources is positively related to the number of the service processes, a sharp increase in the number of the service processes would result in a significant increase in the memory occupation of the static resources, resulting in a large amount of data redundancy on the server.

The related art has no effective solution on how to effectively reduce data redundancy on the server.

SUMMARY

The embodiments of this application provide a data processing method and apparatus for a virtual scene, an electronic device, a non-transitory computer-readable storage medium, and a computer program product, which can effectively reduce data redundancy of the server by realizing dynamic resource isolation and static resource sharing among different single games.

The technical solutions of the embodiments of this application are achieved as follows:

The embodiments of this application provide a data processing method for a virtual scene executed by an electronic device, including:

enabling a plurality of clients to access a plurality of single games via a service process;

allocating static resource masks corresponding to static resources of the service process to the plurality of clients;

allocating dynamic resource masks corresponding to dynamic resources of the service process to the plurality of clients;

sharing the static resources among the plurality of single games based on the static resource masks corresponding to the static resources allocated to the plurality of clients; and isolating the dynamic resources among the plurality of single games based on the dynamic resource masks corresponding to the dynamic resources allocated to the plurality of clients.

The embodiments of this application provide an electronic device, including:

a memory, configured to store executable instructions; and a processor, configured to implement, in executing the executable instructions stored in the memory, the data processing method in a virtual scene provided by the embodiments of this application.

The embodiments of this application provide a non-transitory computer-readable storage medium storing executable instructions configured to, when executed by a processor of an electronic device, cause the electronic device to implement the data processing method in a virtual scene provided by the embodiments of this application.

The embodiments of this application provide a computer program product or computer program including computer instructions, the computer instructions being stored in a non-transitory computer-readable storage medium. A processor of a computer device reads the computer instructions from the computer-readable storage medium, and the processor executes the computer instructions to cause the computer device to execute the data processing method in a virtual scene described above in the embodiments of this application.

The embodiments of this application have the following beneficial effects:

When a plurality of clients access a plurality of single games, the plurality of single games share a service process, and by allocating corresponding static resource masks and dynamic resource masks to the clients in different single games, static resource sharing and dynamic resource isolation are realized among the plurality of single games, thereby significantly reducing the number of the service processes. Since the size of the memory occupied by the static resources is positively related to the number of the service processes, the significantly reducing the number of the service processes enables the memory space occupation of the static resources to be significantly reduced, thereby effectively reducing the data redundancy of the server.

BRIEF DESCRIPTION OF THE DRAWINGS

FIGS. 3A to 3G are flow diagrams of a data processing method for a virtual scene provided by an embodiment of this application.

FIGS. 4A to 4D are schematic diagrams of a data processing method for a virtual scene provided by an embodiment of this application.

DESCRIPTION OF EMBODIMENTS

Figure 1:
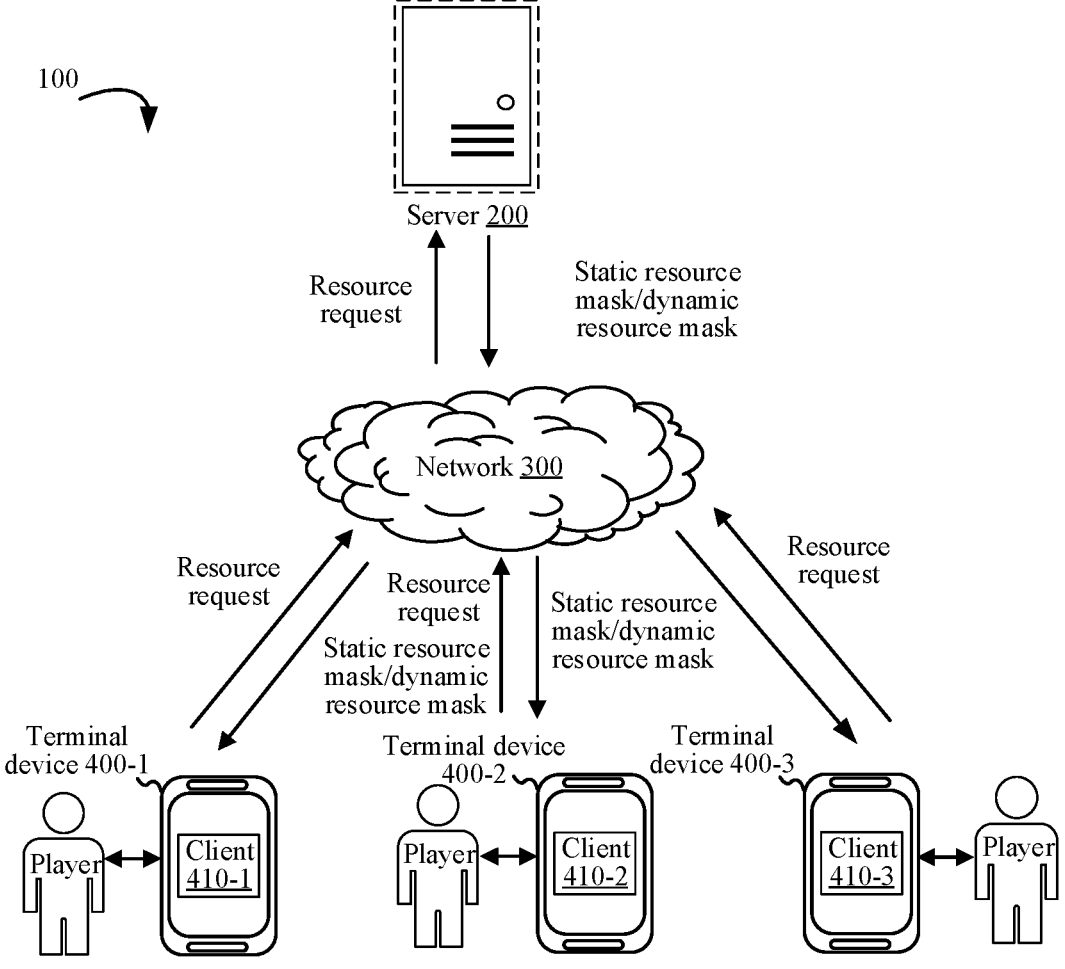
FIG. 1 is an architectural diagram of a data processing system 100 for a virtual scene provided by an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and may be combined with each other without conflict.

In the following description, the terms "first, second, and third" are merely intended to distinguish similar objects and do not represent a particular ordering of the objects. It may be understood that the terms "first, second, and third" may be interchanged either in a particular order or in a sequential order, as permitted, to enable the embodiments of this application described herein to be implemented other than that illustrated or described herein.

Unless otherwise defined, meanings of all technical and scientific terms used in this specification are the same as those usually understood by a person skilled in the art to which this application belongs. The terms used herein are for the purpose of describing the embodiments of this application only and are not intended to limit this application.

Before the embodiments of this application are further described in detail, a description is made on nouns and terms in the embodiments of this application, and the nouns and terms in the embodiments of this application are applicable to the following explanations.

(1) A virtual scene is a scene that a game program displays when running on a terminal device. The scene may be a real-world simulation environment, a semi-simulation semi-fictional environment, or a purely fictional virtual environment. The virtual scene may be any one of a two-dimensional (2D) virtual scene, a 2.5-dimensional (2.5D) virtual scene, or a three-dimensional (3D) virtual scene; and the dimensions of the virtual scene are not limited in the embodiments of this application. For example, the virtual scene may include a sky, a land, a sea, and the like. The land may include an environmental element such as a desert, a city, and the like. A user may control the virtual object to move in the virtual scene.

(2) Static resources are non-interactive resources in the virtual scene, namely, resources whose states unable to change during a game process; for example, the static resources may be building architectures, road surface scenes, mountain oceans, and the like in an online game.

(3) Dynamic resources are resources capable of interacting in the virtual scene, that is, resources whose states may change during the game process, for example, the dynamic resources may be virtual characters controlled by a player, walls that may be destroyed, and virtual bullets.

(4) In response to is used for representing a condition or state upon which the performed operation depends. The performed operation or operations may be in real-time or may have a set delay in response to meeting the dependent condition or state. Without being specifically stated, there is no limitation in the order of execution of the performed operations.

(5) A cloud game is a game mode based on cloud computing; in the operation mode of the cloud game, all games are run at a server end, and the rendered game pictures are compressed and then sent to a user via a network. On the client, the gaming device of the user does not require any high-end processors and video cards, only requiring basic video decompression capabilities.

(6) A single game may be a single match in the online game; the single match refers to a round of battle that characters controlled by at least two online game players are allocated after participating in the matching.

(7) A dedicated server (DS), short for a server, is a server running without an interface; the server running without the interface does not present any visual effects, and the player does not run the game locally on the server. This allows the DS to concentrate on the game logic and adjust incoming information from the client to take full advantage of its resources to host the game. A process running on the server, used for providing related services for the client to display the virtual scene, is called a service process, short for a process.

(8) A client is a game application running in the terminal device.

Figure 5A:
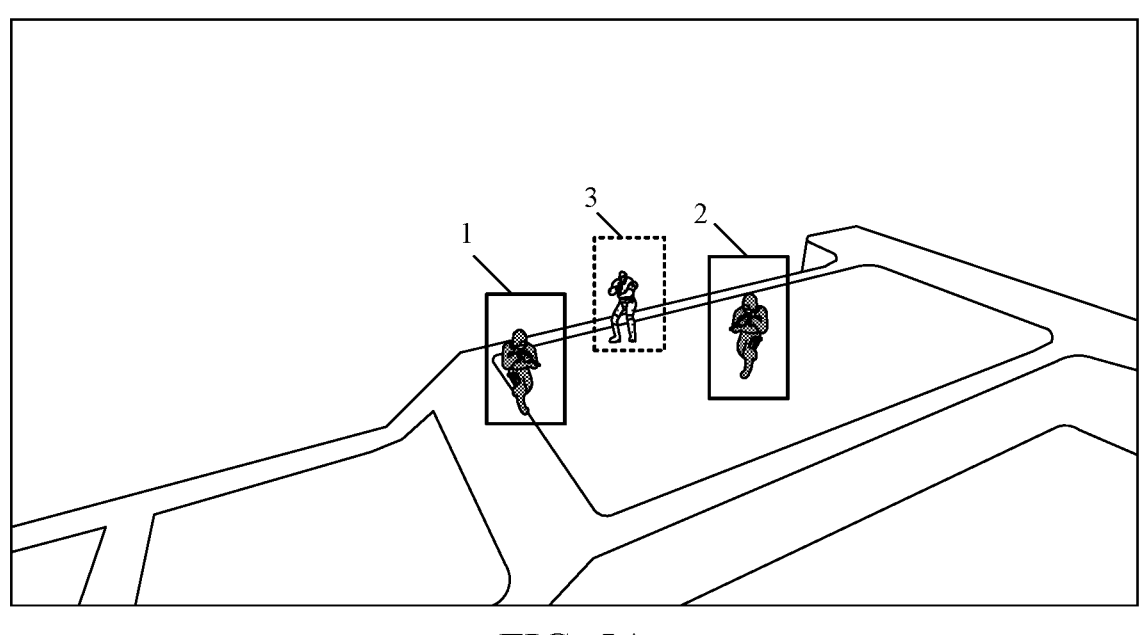
FIGS. 5A to 5J are effect diagrams of a data processing method for a virtual scene provided by an embodiment of this application.
Figure 5B:
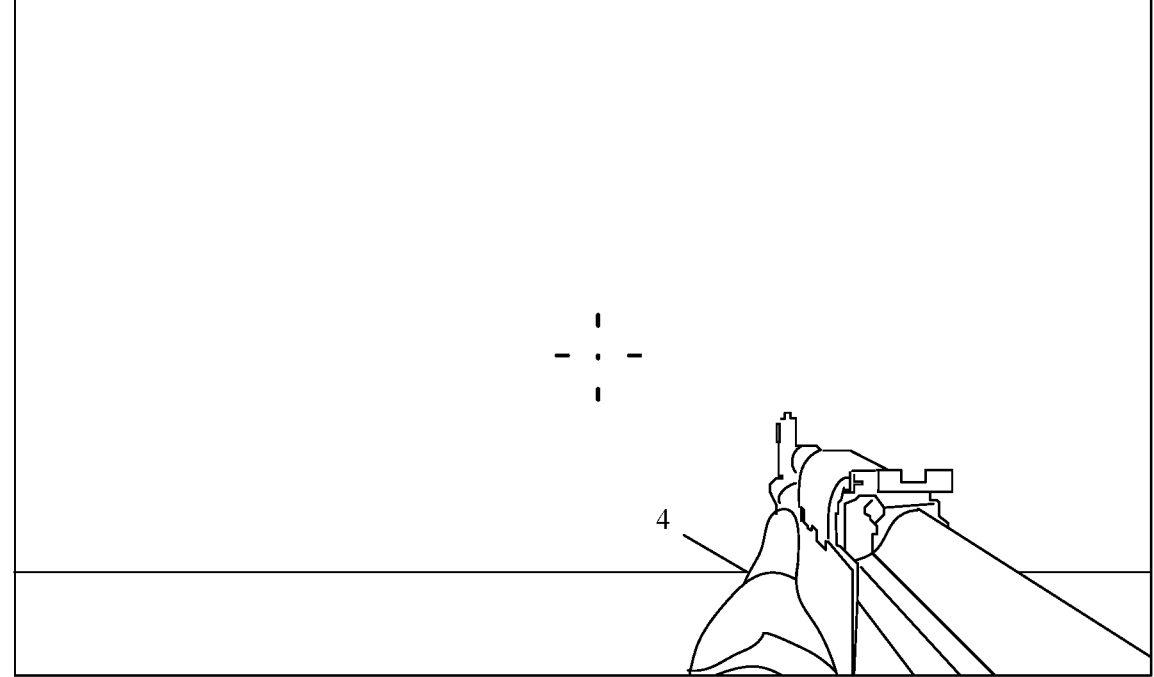
Figure 5C:
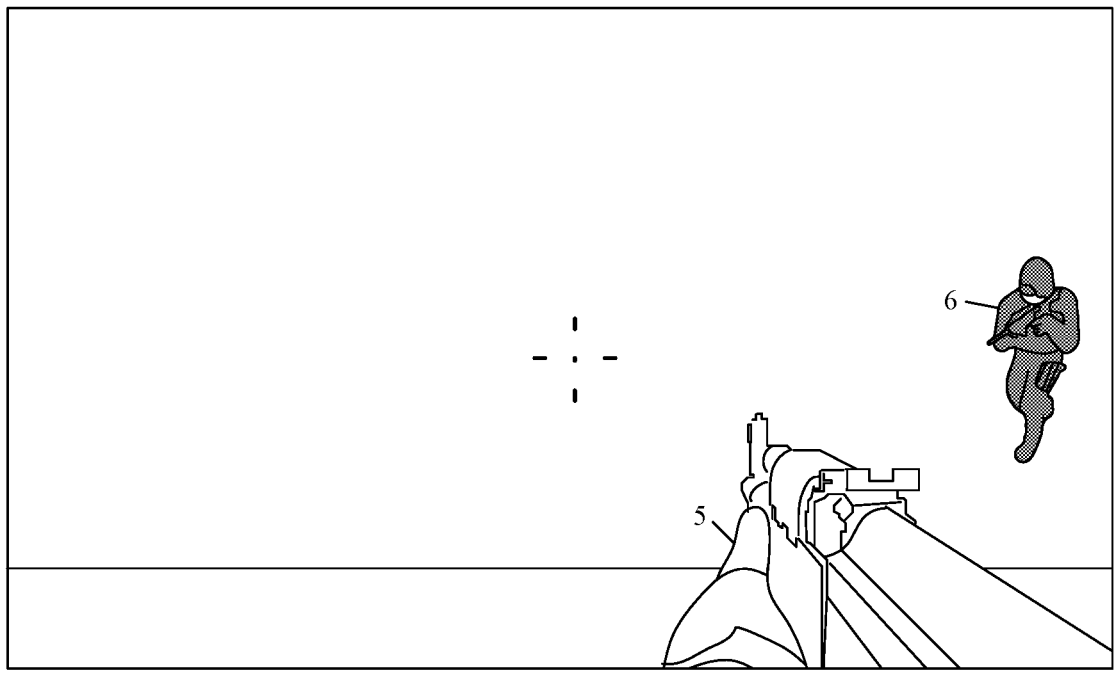
Figure 5D:
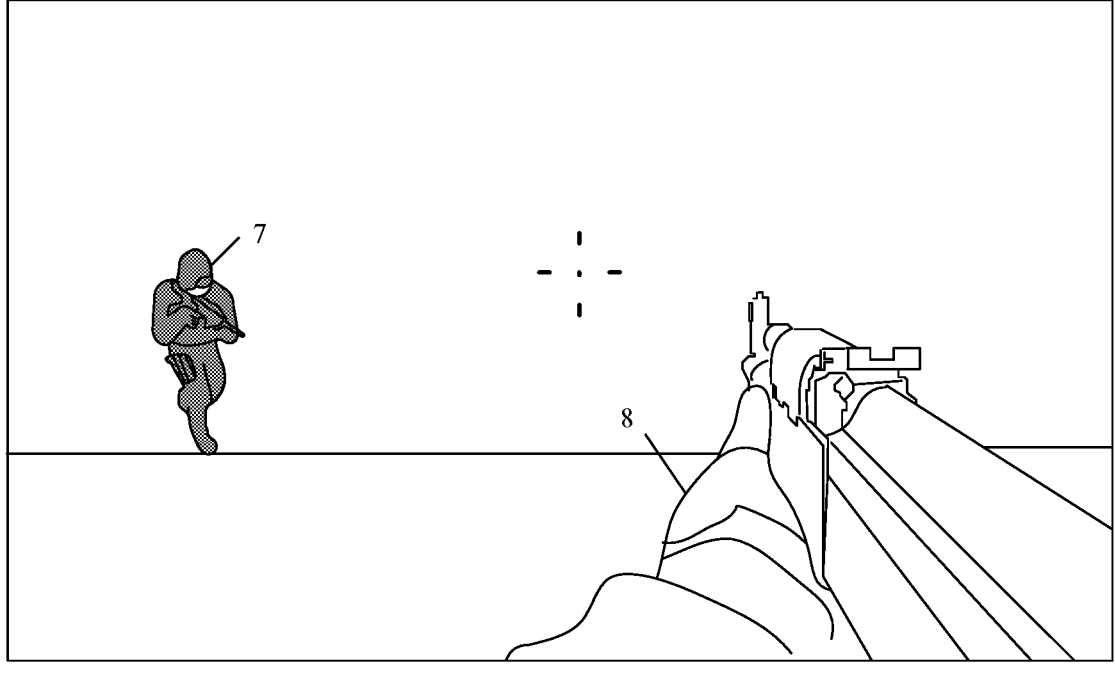
Figure 5E:
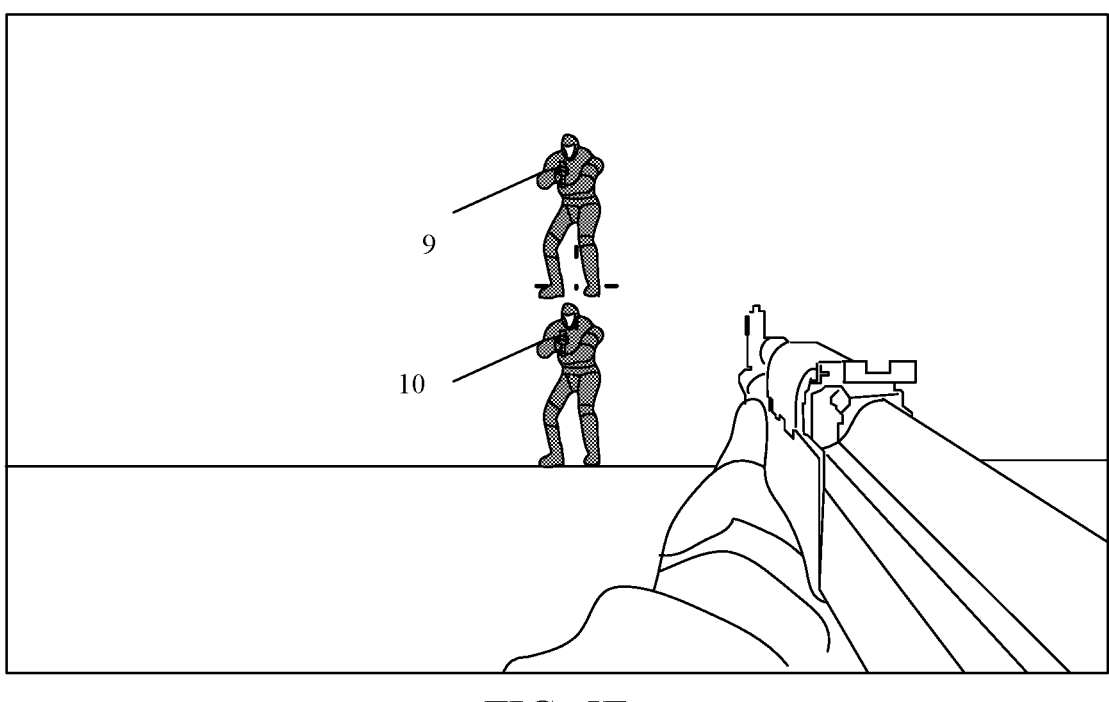
Figure 5F:
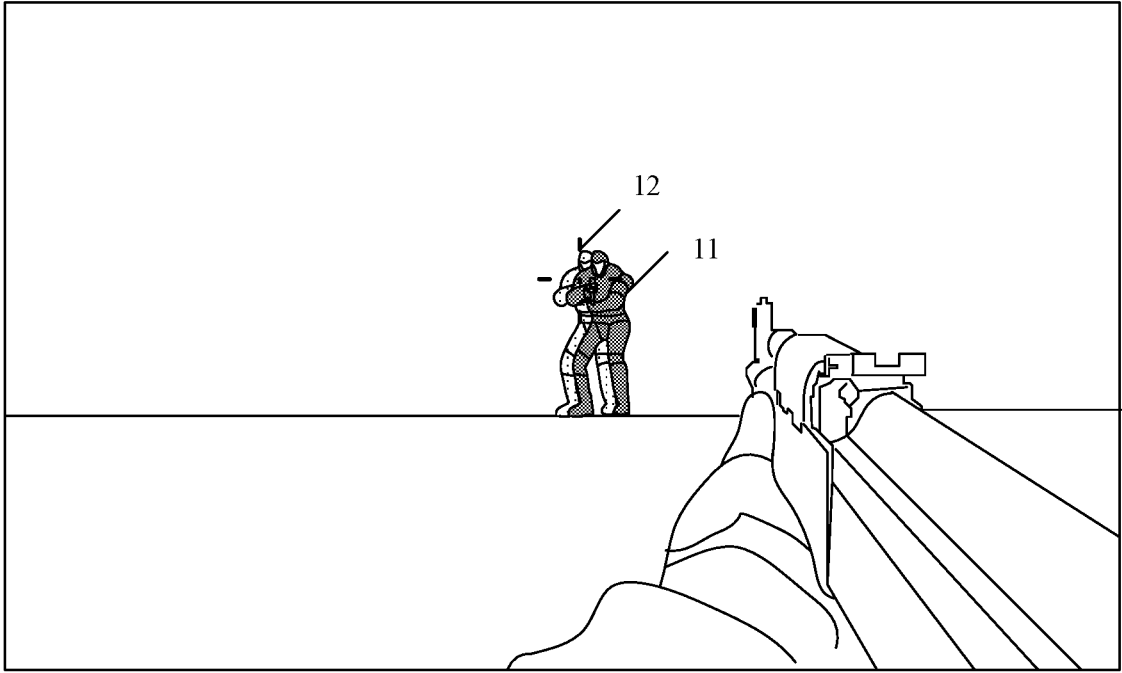
Figure 5G:
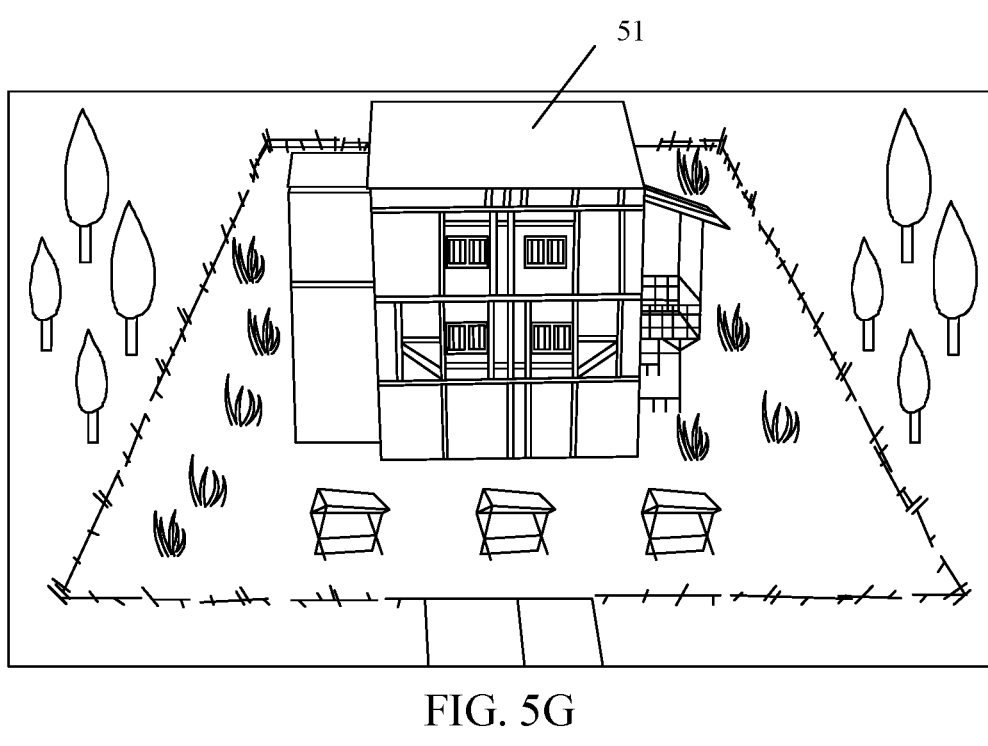
Figure 5H:
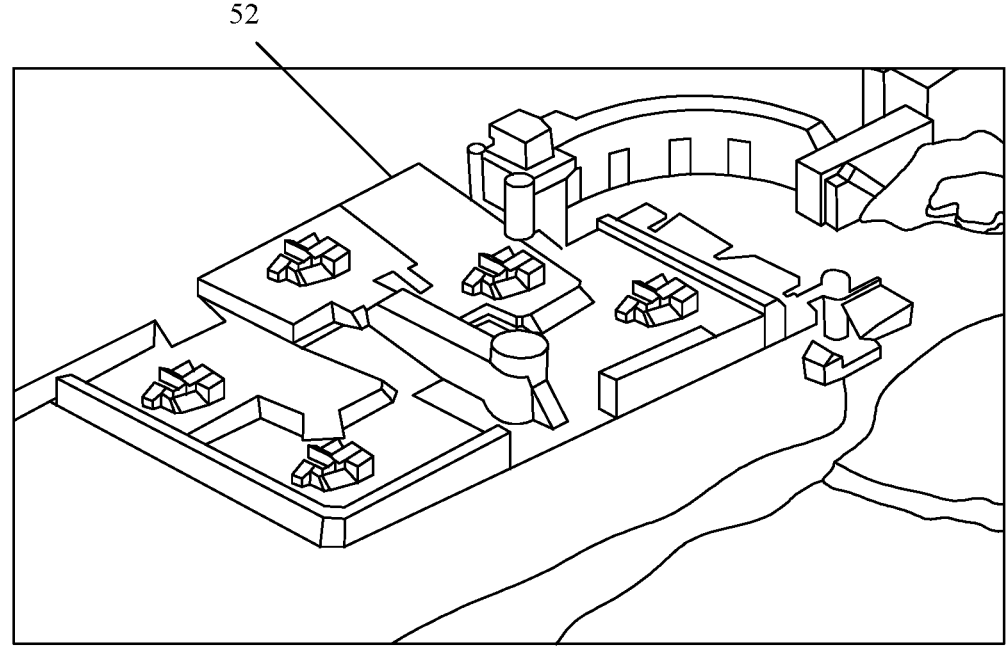
Figure 5I:
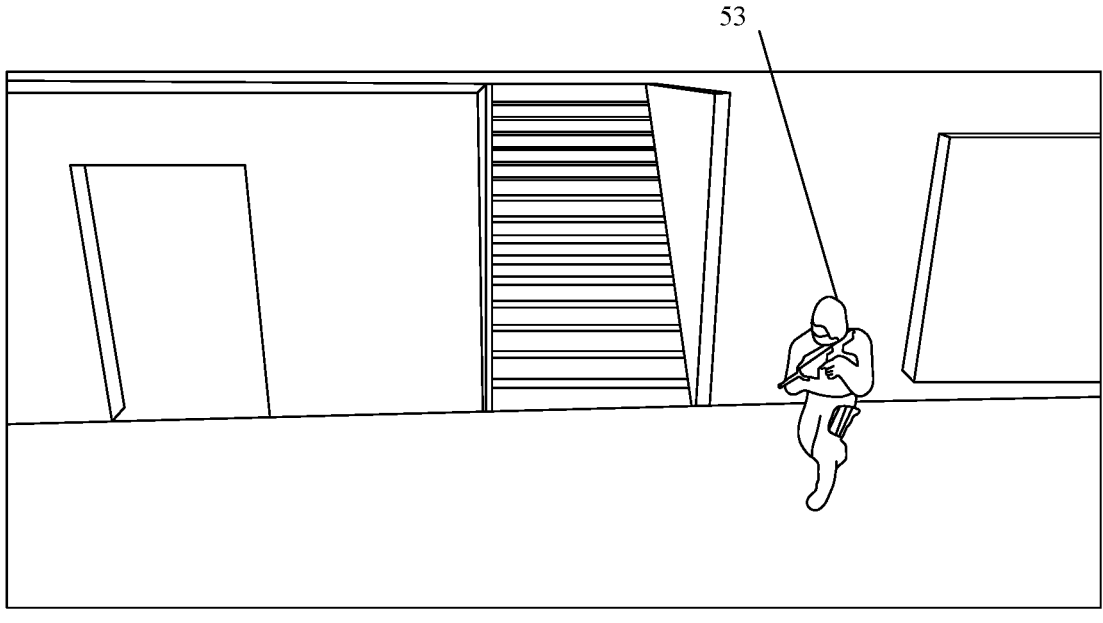
Figure 5J:
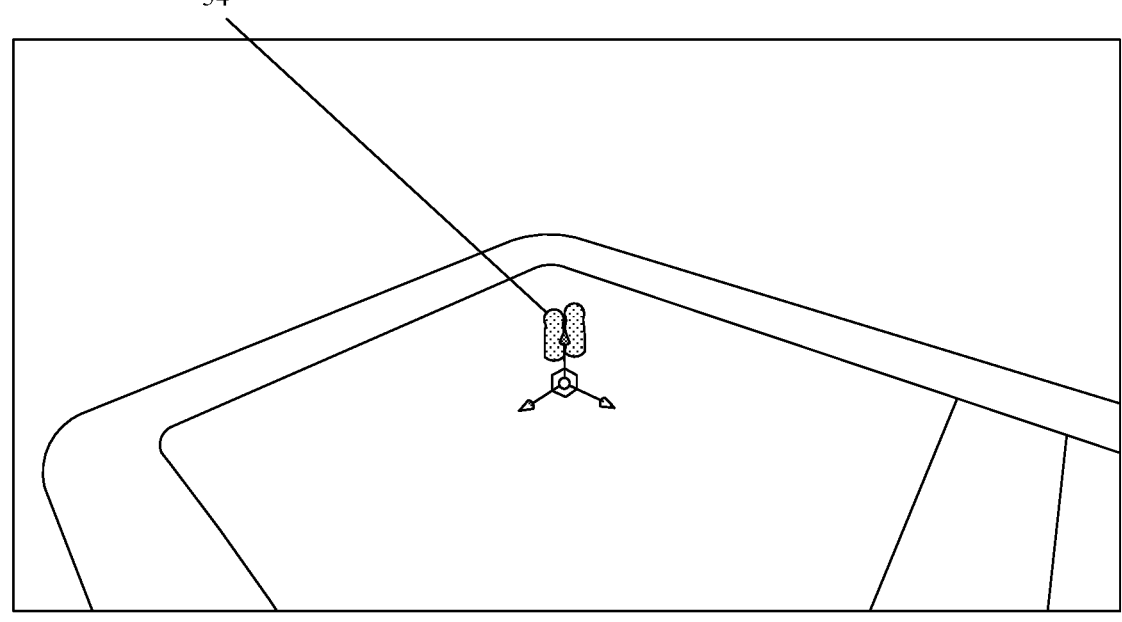
Figure 5K:
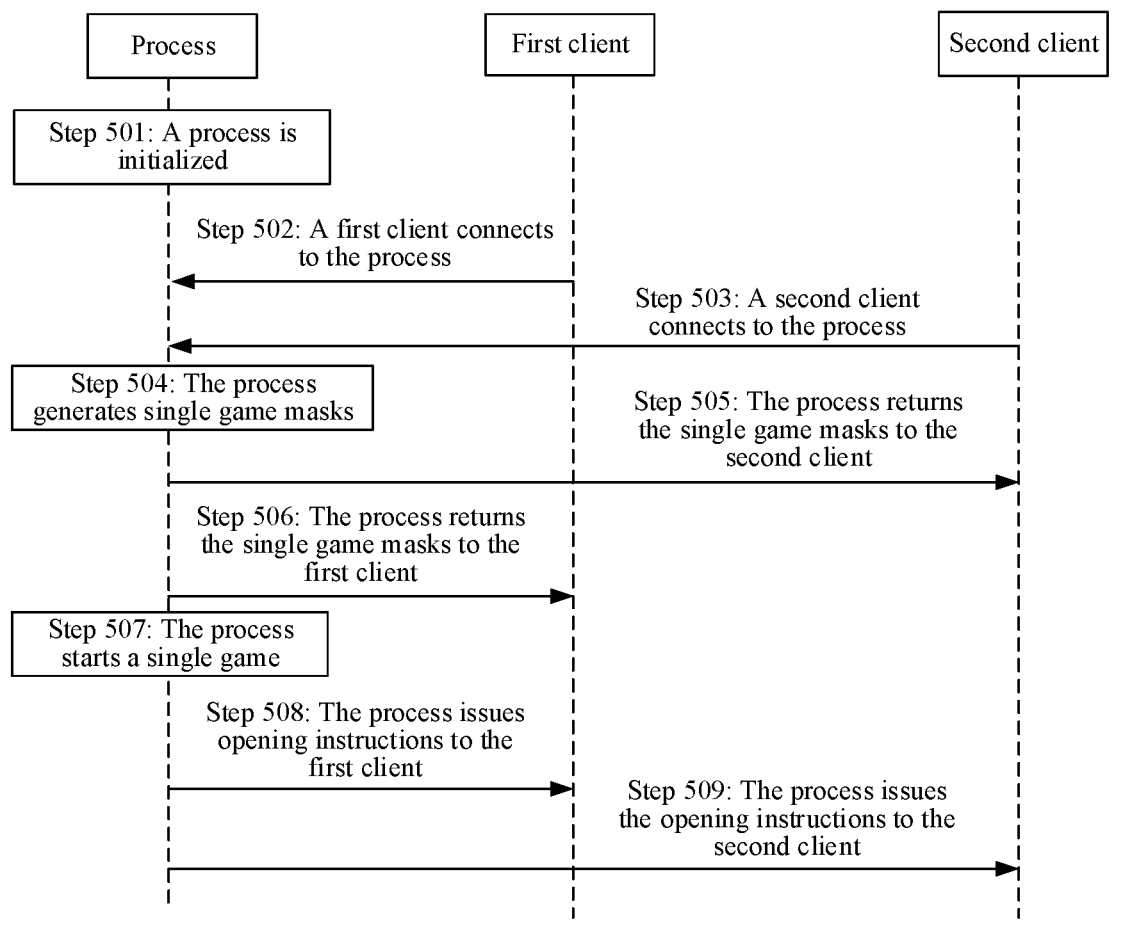
FIGS. 5K to 5M are flow diagrams of a data processing method for a virtual scene provided by an embodiment of this application.
Figures 5L, 5M:
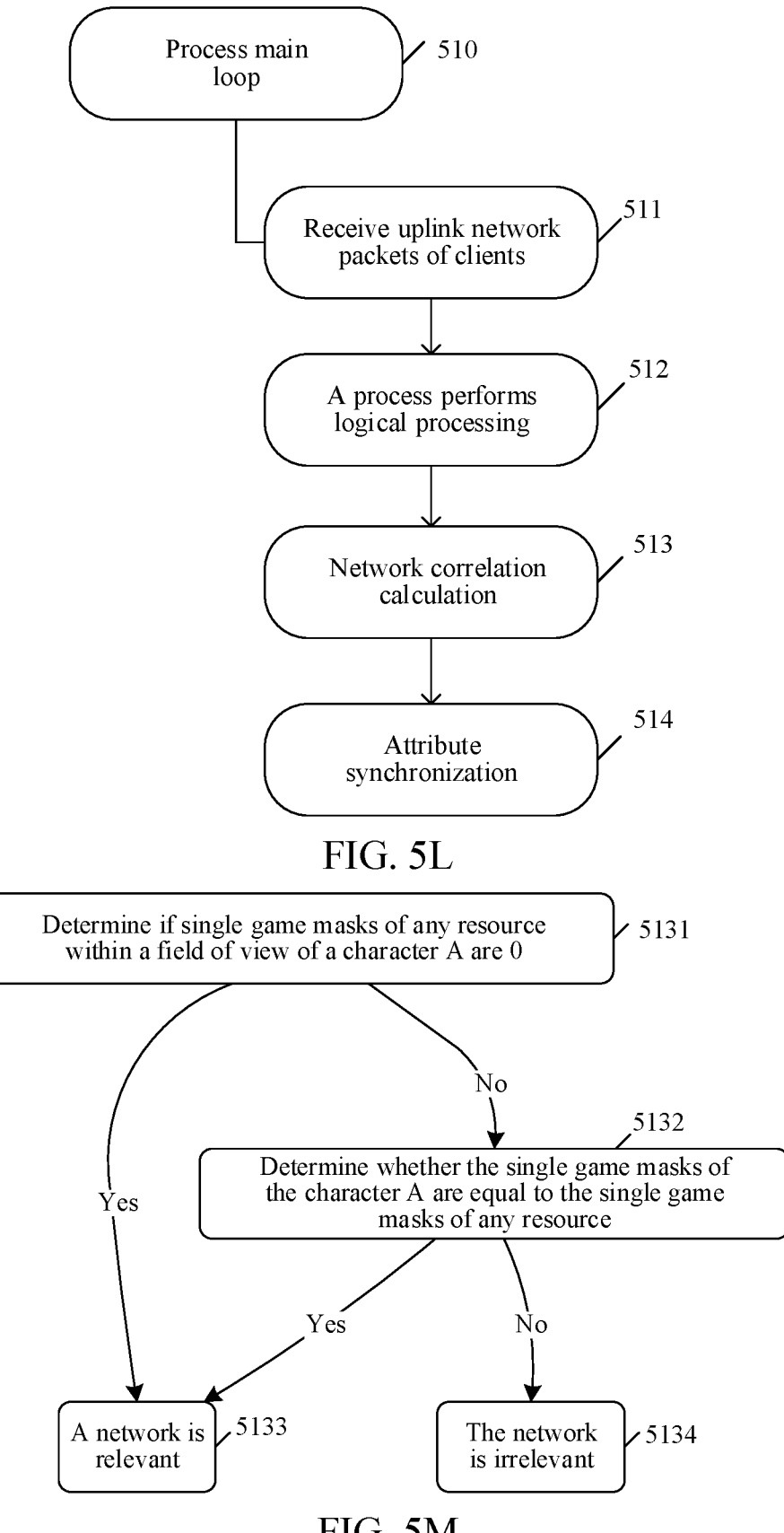
Figures 5N, 5O:
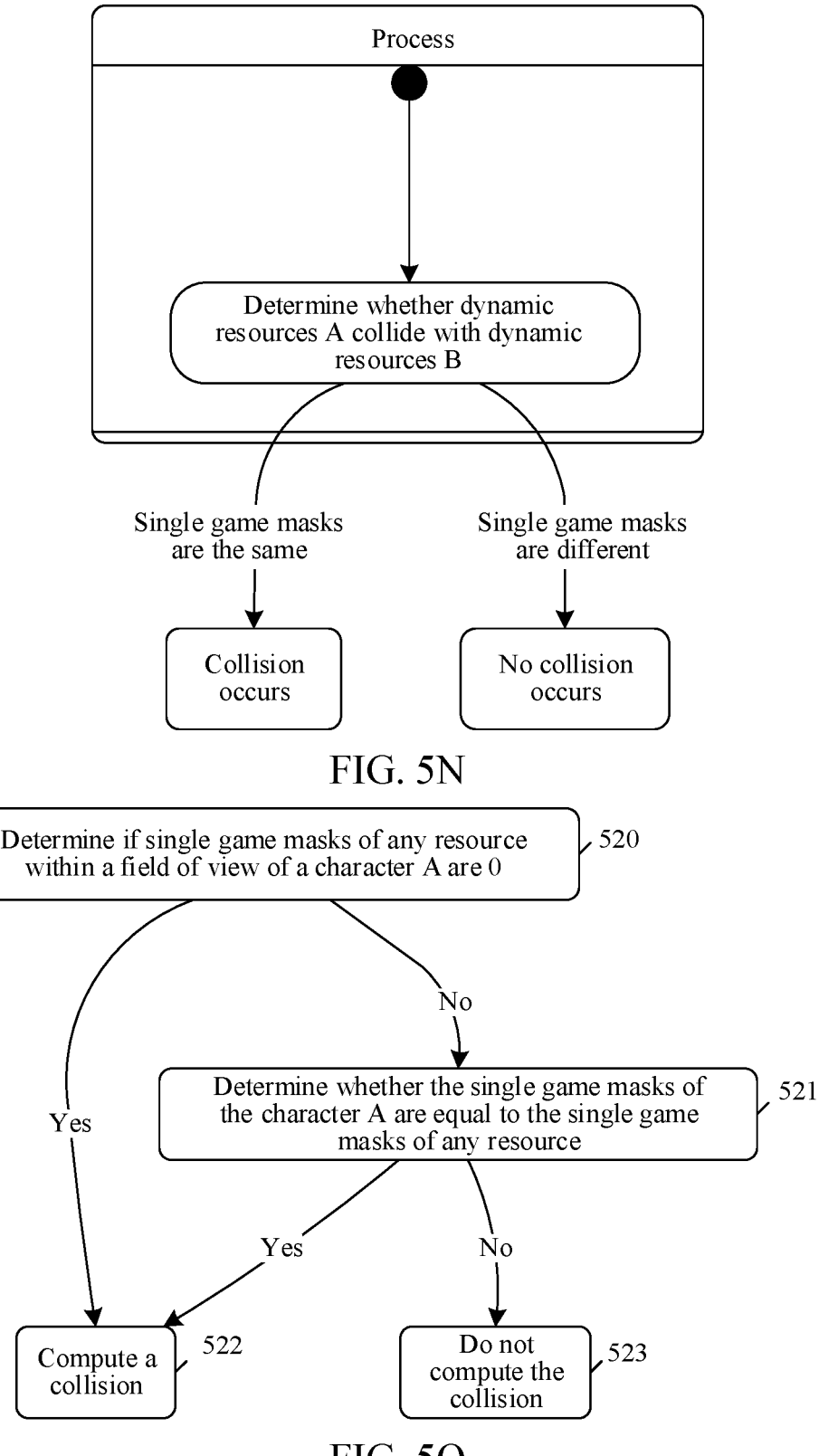
FIG. 5N is a schematic diagram of a data processing method for a virtual scene provided by an embodiment of this application.
FIG. 5O is a flow diagram of a data processing method for a virtual scene provided by an embodiment of this application.
Figures 5P, 5Q, 5R:
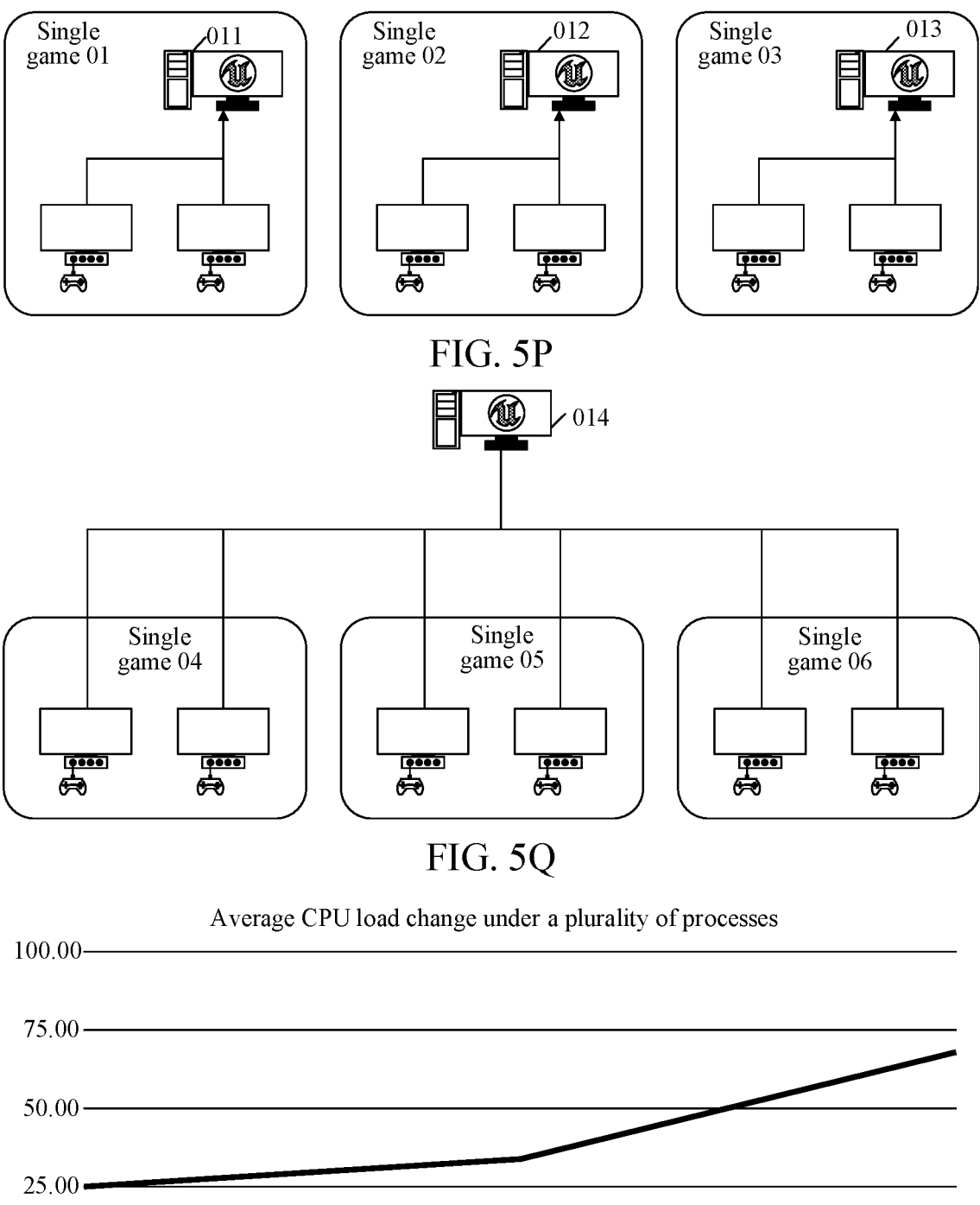
FIG. 5P is a schematic diagram provided by the related art.
FIG. 5Q is a schematic diagram of a data processing method for a virtual scene provided by an embodiment of this application.
FIGS. 5R to 5S are schematic diagrams provided by the related art.

During the implementation of the embodiments of this application, the applicant has found that there are the following problems in the related art:

Referring to FIG. 5P, FIG. 5P is a schematic diagram provided by the related art. In the related art, each single game needs to correspondingly initiate a process to run an online game, that is, single game 01 corresponds to process 011, single game 02 corresponds to process 012, and single game 03 corresponds to process 013. Thus, in the related art, the number of processes is equal to the number of single games. In facing massive single games, there is a need in the related art to ensure that the same number of processes are run. Since the life cycle of a process is consistent with the runtime of a single game, a process is created as a single game is created and destroyed as a single game is destroyed. The size of the memory occupied by static resources is linearly related to a process, for example, the static resources occupied by two processes are twice the static resources occupied by one process.

Then, in the related art, when faced with mass processes running at the same time and mass processes destroying at the same time, the following problems occur:

(1) Increased memory occupation: According to the above analysis, the size of the memory occupied by static resources is positively related to the number of processes, and the static resources occupied by two processes are twice the static resources occupied by one process. When a plurality of processes contain the same static resources, the static resources are reloaded, resulting in increased memory occupation. For example, the plurality of processes run the same game gate, and the same gate may be reloaded in the plurality of processes. Large maps include regional copies; different regional copies use the same static resources, which are reloaded in the plurality of processes.

(2) Increased central processing unit (CPU) load: Since the size of the memory occupied by the static resources is positively related to the number of processes, an increase in the number of single games results in an increase in the CPU load, limiting the upper bound on the physical server's bearer. For example, four clients may play a game in the same single game, and 100 clients would need to start 25 processes. The increase of a process may result in an increase in L3 cache miss. Referring to FIG. 5R, FIG. 5R is a schematic diagram provided by the relevant art; and as shown in FIG. 5R, the increase in L3 cache miss shows that the growth rate of the CPU load is greater than a linear growth rate, and as the number of processes increases, the CPU occupation of a single process correspondingly increases.

Figure 5S:
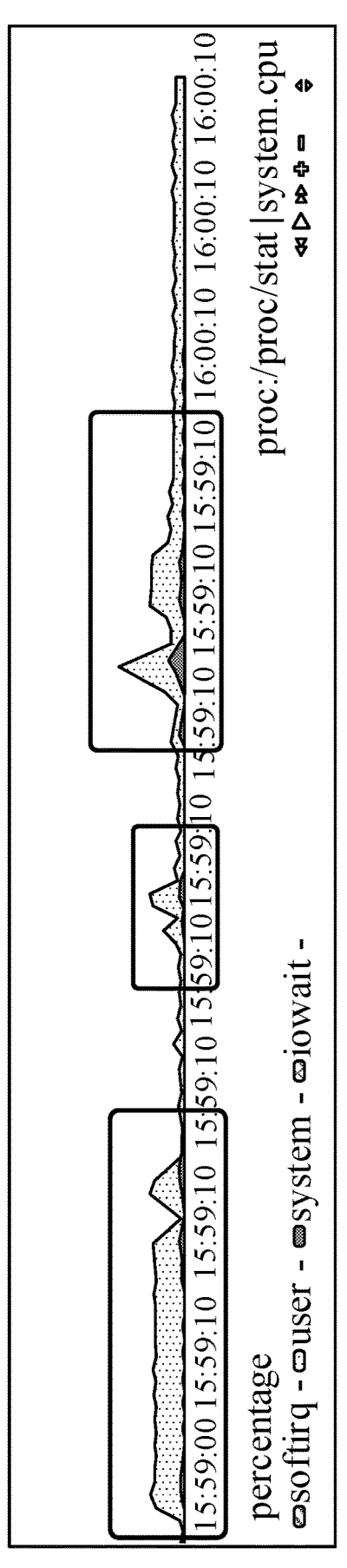

(3) The process is repeatedly pulled up: Referring to FIG. 5S, FIG. 5S is a schematic diagram provided by the related art. The life cycle of the process follows a single game. The process is started at the beginning of the single game, and the process is ended when the single game is closed, which means that during the operation of the single game, large amounts of redundant overheads of resource loading, unloading, and construction are generated. As shown in FIG. 5S, CPU load jitter is generated during each process creation.

The embodiments of this application provide a data processing method and apparatus for a virtual scene, an electronic device, a non-transitory computer-readable storage medium, and a computer program product, which can effectively reduce data redundancy of the server by realizing dynamic resource isolation and static resource sharing among different single games. An exemplary application of the electronic device provided by the embodiments of this application is described below. The electronic device provided by the embodiments of this application may be implemented as various types of user terminals such as a laptop, a tablet, a desktop computer, a set-top box, and a mobile device (for example, a mobile phone, a portable music player, a personal digital assistant, a dedicated messaging device, and a portable gaming device), and may also be implemented as servers. In addition, one of a plurality of terminal devices may be used as a server, for example, a desktop computer with a computing capability greater than a computing capability threshold may be used as a server, and the remaining user terminals may be used as clients. In the following, an exemplary application when the electronic device is implemented as a server will be described.

Referring to FIG. 1, FIG. 1 is an architectural diagram of a data processing system 100 for a virtual scene provided by an embodiment of this application. To realize an application scene for processing an online game (for example, a plurality of terminals acquire static resources and dynamic resources from a network server), a terminal device (a terminal device 400-1, a terminal device 400-2, and a terminal device 400-3 are illustratively shown) is connected to a server 200 via a network 300; the network 300 may be a wide area network or a local area network, or a combination of both.

The terminal device 400-1 runs the client 410-1 (for example, an online game client), the terminal device 400-2 runs the client 410-2, and the terminal device 400-3 runs the client 410-3. The terminal device 400-1, the terminal device 400-2, and the terminal device 400-3 are connected to the server 200 each other through a wired or wireless network.

In some embodiments, the server 200 may be an independent physical server, may also be a server cluster or distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), and a large data and artificial intelligence (AI) platform. The terminal device 400-1, the terminal device 400-2, and the terminal device 400-3 may be a smartphone, a tablet, a laptop, a desktop computer, a smart speaker, a smart watch, a vehicle-mounted terminal, and the like, but are not limited thereto. The terminal device and the server may be directly or indirectly connected through wired or wireless communication, which are not limited in the embodiments of this application.

In some embodiments, the embodiments of this application may be implemented through cloud technology, which refers to a hosting technology for unifying a series of resources, such as hardware, software, and a network, in a wide area network or a local area network to realize the calculation, storage, processing, and sharing of data.

Cloud technology is a general term of network technology, information technology, integration technology, management platform technology, and application technology based on cloud computing business model application, which can form a resource pool, be used as needed, and be flexible and convenient. Cloud computing will become an important support. Background services of technical network systems require a large amount of computing and storage resources.

The configuration of the electronic device provided by the embodiments of this application will be described below.

Figure 2A:
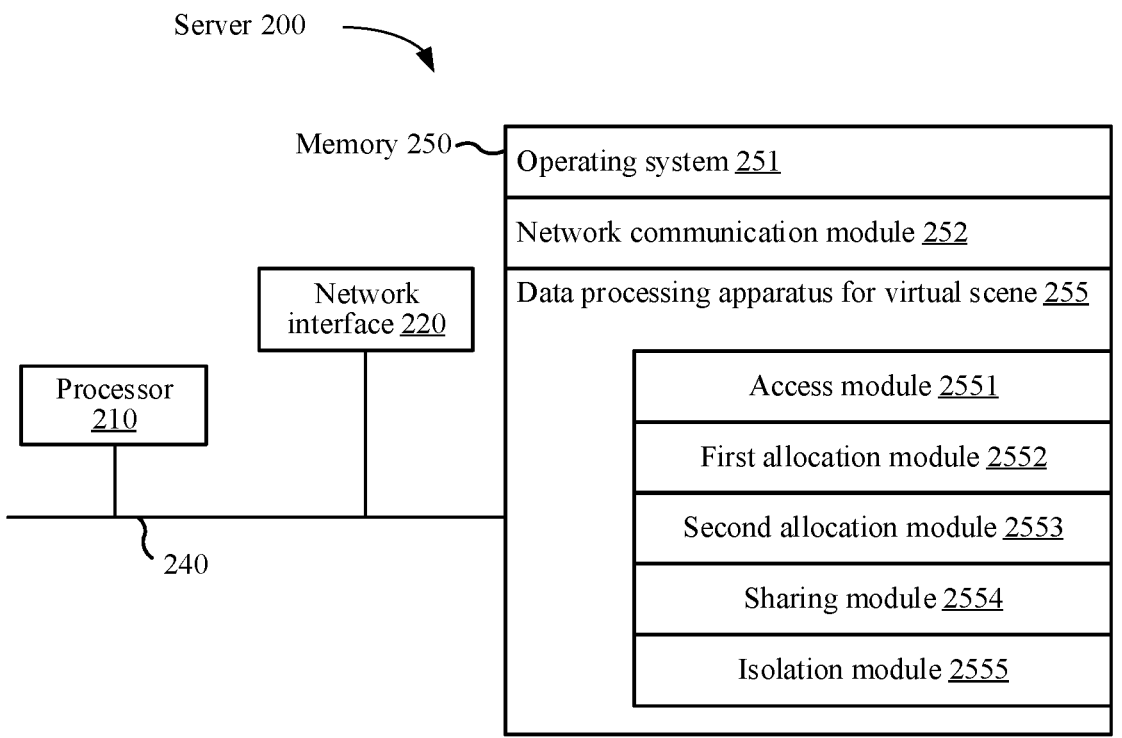
FIG. 2A is a structural diagram of a server 200 provided by an embodiment of this application.

In some embodiments, an electronic device being the server 200 shown in FIG. 1 is taken as an example. Referring to FIG. 2A, FIG. 2A is a structural diagram of a server 200 provided by an embodiment of this application. The server 200 shown in FIG. 2A includes at least one processor 210, a memory 250, and at least one network interface 220. Components on the server 200 are coupled together by using a bus system 240. It may be understood that, the bus system 240 is configured to implement connection and communication between the components. The bus system 240 includes a power bus, a control bus, and a status signal bus in addition to a data bus. However, for the sake of clarity, the various buses are labeled as the bus system 240 in FIG. 2A.

The processor 210 may be an integrated circuit chip with signal processing capabilities, such as a general-purpose processor, a digital signal processor (DSP), or other programmable logic devices, discrete gate or transistor logic devices, and discrete hardware assemblies; the general-purpose processor may be a microprocessor or any conventional processor, and the like.

The memory 250 may be removable, non-removable, or a combination thereof. Exemplary hardware devices include solid state memories, hard disk drives, optical disk drives, and the like. The memory 250 includes one or more storage devices physically located remotely from the processor 210.

The memory 250 includes a volatile memory or a non-volatile memory, and may include both volatile and non-volatile memories. The non-volatile memory may be a read-only memory (ROM), and the volatile memory may be a random-access memory (RAM). The memory 250 described in the embodiments of this application is intended to include any suitable type of memory.

In some embodiments, the memory 250 can store data to support various operations, and the examples of the data include programs, modules, and data structures, or subsets or superset thereof, as exemplified below.

An operating system 251 is used for implementing various basic services and processing hardware-based tasks, including system programs for processing various basic system services and executing hardware-related tasks, such as a framework layer, a core library layer, and a driver layer.

A network communication module 252 is used for reaching other electronic devices via one or more (wired or wireless) network interfaces 220, an exemplary network interface 220 including: Bluetooth, WiFi, a universal serial bus (USB), and the like.

In some embodiments, a data processing apparatus for a virtual scene provided by an embodiment of this application may be implemented in a software manner; the data processing apparatus for a virtual scene may be a functional entity on the server 200; the data processing apparatus for a virtual scene may implement the function of a service process on the server 200; a plurality of service processes serve different clients; and the service process on the server 200 may be written in software code environments of different programming languages. FIG. 2A shows a data processing apparatus 255 for a virtual scene stored in a memory 250, which may be software in the form of a program, a plug-in, and the like, including the following software modules: an access module 2551, a first allocation module 2552, a second allocation module 2553, a sharing module 2554, and an isolation module 2555, which are logical and therefore can be arbitrarily combined or further split depending on the function implemented. The functions of the various modules will be described below.

Figure 2B:
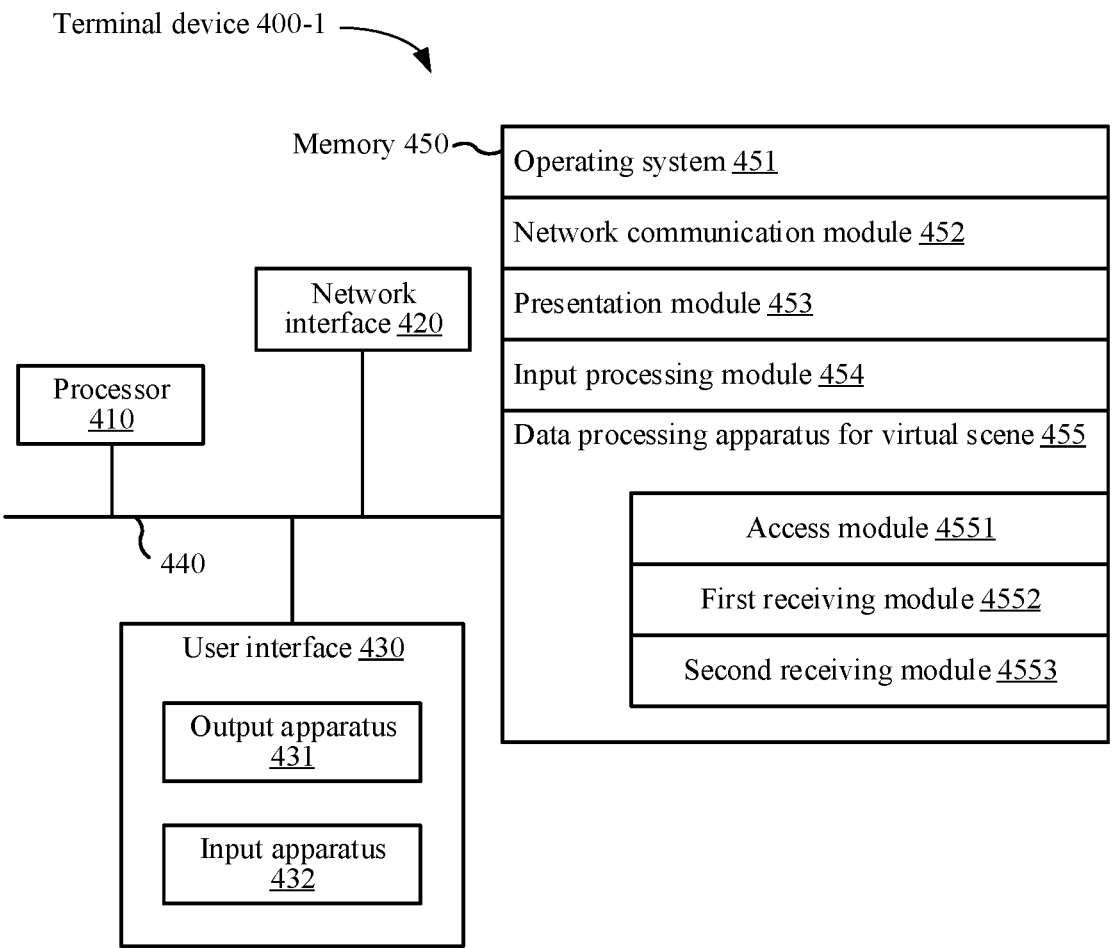
FIG. 2B is a structural diagram of a terminal device 400-1 provided by an embodiment of this application.

In some embodiments, an electronic device being the terminal device 400-1 shown in FIG. 1 is taken as an example. Referring to FIG. 2B, FIG. 2B is a structural diagram of a terminal device 400-1 provided by an embodiment of this application. The terminal device 400-1 shown in FIG. 2B includes at least one processor 410, a memory 450, at least one network interface 420, and a user interface 430. The various assemblies in the terminal device 400-1 are coupled together by a bus system 440. It may be understood that, the bus system 440 is configured to implement connection and communication between the components. The bus system 440 includes a power bus, a control bus, and a status signal bus in addition to a data bus. However, for the sake of clarity, the various buses are labeled as the bus system 440 in FIG. 2B.

The user interface 430 includes one or more output apparatuses 431 enabling the presentation of media content, including one or more speakers and/or one or more visual display screens. The user interface 430 further includes one or more input apparatuses 432, including user interface components that facilitate user input, such as a keyboard, mouse, microphone, touch-screen display screen, camera, other input buttons, and controls.

A presentation module 453 is used for enabling presentation of information (for example, a user interface for operating peripheral devices and displaying content and information) via one or more output apparatuses 431 (for example, a display screen and a speaker) associated with the user interface 430.

An input processing module 454 is used for detecting one or more user inputs or interactions from one of the one or more input apparatuses 432 and interpreting the detected inputs or interactions.

In some embodiments, the data processing apparatus for a virtual scene provided by the embodiments of this application may be implemented in a software manner. FIG. 2B shows a data processing apparatus 455 for a virtual scene stored in a memory 450, which may be software in the form of a program, a plug-in, and the like, including the following software modules: an access module 4551, a first receiving module 4552, and a second receiving module 4553, which are logical and therefore can be arbitrarily combined or further split depending on the function implemented. The functions of the various modules will be described below.

A data processing method for a virtual scene provided by the embodiments of this application will be described in conjunction with an exemplary application and implementation of a server or a terminal device provided by the embodiments of this application.

Referring to FIG. 3A, FIG. 3A is a flow diagram of a data processing method for a virtual scene provided by an embodiment of this application. There will be an illustration in conjunction with steps 101 to 105 shown in FIG. 3A; the execution subjects of steps 101 to 105 may be the foregoing server; the following steps 101 to 105 may be executed by a service process of the server; and the server may have a plurality of service processes, and the plurality of service processes serve different clients.

Step 101: Access a plurality of clients to a plurality of single games.

In some embodiments, the plurality of single games share a service process and the service process includes static resources and dynamic resources of the virtual scene, that is, at least two single games share one service process. The single game may be a single match in the online game; the single match refers to a single match game that virtual characters controlled by at least two online game players are allocated after participating in the matching.

Figures 4B, 4C, 4D:
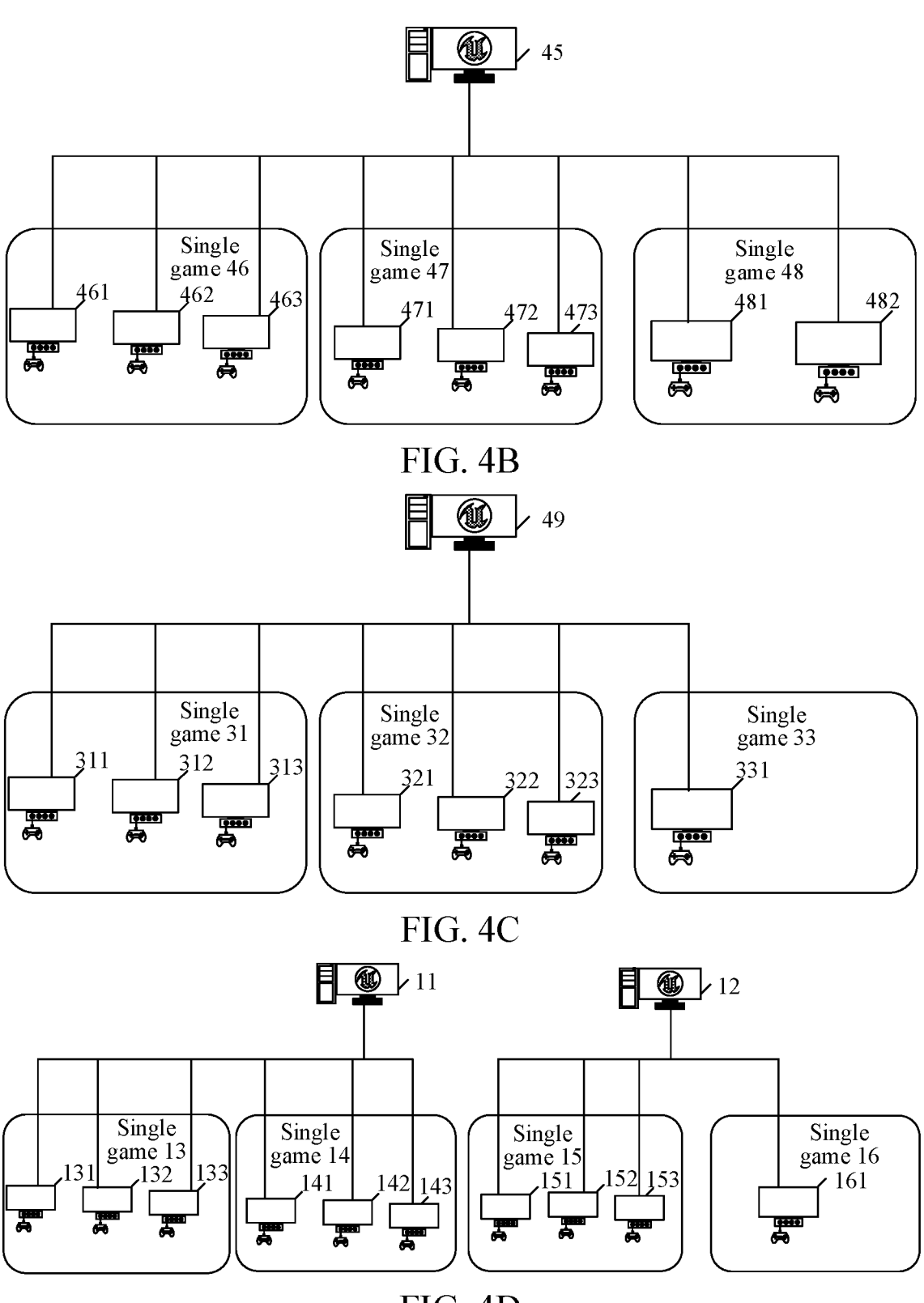

As an example, referring to FIG. 4D, FIG. 4D is a schematic diagram of a data processing method for a virtual scene provided by an embodiment of this application. The service process 11 accesses the client 131, the client 132, and the client 133 to the single game 13. The service process 11 accesses the client 141, the client 142, and the client 143 to the single game 14. The service process 12 accesses the client 151, the client 152, and the client 153 to the single game 15. The service process 16 accesses the client 161 to the single game 16. The single games 13 and 14 share the service process 11, and the single games 15 and 16 share the service process 12.

Figure 3B:
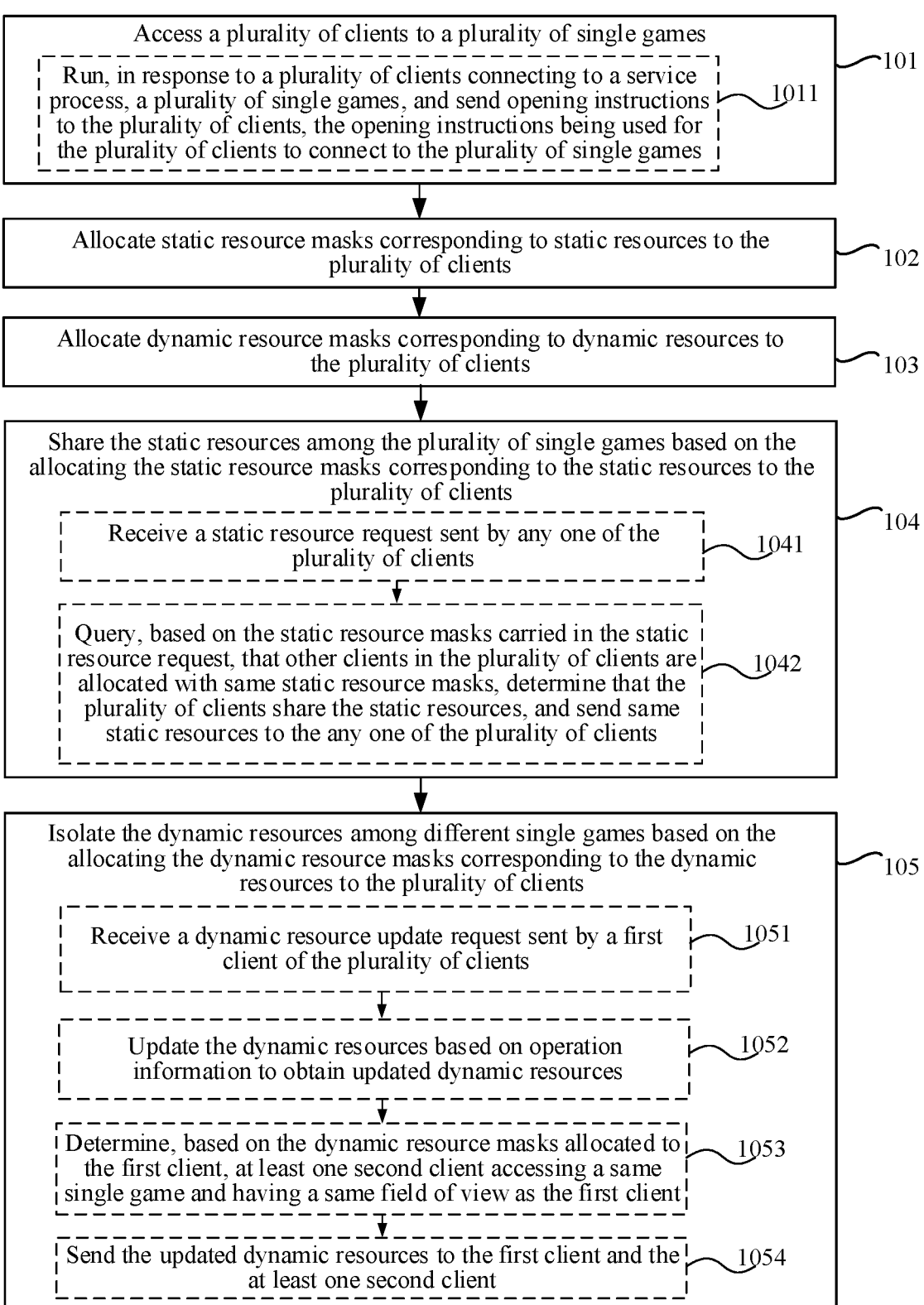

In some embodiments, referring to FIG. 3B, FIG. 3B is a flow diagram of a data processing method for a virtual scene provided by an embodiment of this application. As shown in FIG. 3B, step 101 shown in FIG. 3A may be implemented by step 1011 shown in FIG. 3B, which will be described below in conjunction with step 1011 shown in FIG. 3B.

Step 1011: Run, in response to the plurality of clients connecting to the service process, the plurality of single games, and send opening instructions to the plurality of clients to connect the plurality of clients to the plurality of single games.

In some embodiments, each client connects to one single game, and the number of accesses to each single game is greater than or equal to an opening threshold and less than or equal to a closing threshold, the closing threshold characterizing a maximum number of clients in a single game that may be accessed, and the opening threshold characterizing a minimum number of clients that a single game needs to access to begin.

As an example, referring to FIG. 4A, FIG. 4A is a schematic diagram of a data processing method for a virtual scene provided by an embodiment of this application. A service process 41 runs a single game 42, a single game 43, and a single game 44 in response to a client 421, a client 422, a client 431, a client 432, a client 441, and a client 442 connecting to the service process and sends opening instructions to the client 421, client 422, client 431, client 432, client 441, and client 442 to connect the client 421 and client 422 to the single game 42, the client 431 and client 432 to the single game 43, and the client 441 and client 442 to the single game 44.

As an example, referring to FIG. 4A, the number of accesses to each single game is greater than or equal to the opening threshold and less than or equal to the closing threshold; the number of accesses to the single game 42 is two, and the opening threshold may be one, and the closing threshold may be two, that is, the number of accesses to the single game 42 is greater than the opening threshold and equal to the closing threshold.

As an example, referring to FIG. 4C, FIG. 4C is a schematic diagram of a data processing method for a virtual scene provided by an embodiment of this application. As shown in FIG. 4C, a service process 49 runs a single game 31, a single game 32, and a single game 33 in response to a client 311, a client 312, a client 313, a client 321, a client 322, a client 323, and a client 331 connecting to the service process 49 and sends opening instructions to the client 311, client 312, client 313, client 321, client 322, client 323, and client 331 to connect the client 311, client 312, and client 313 to the single game 31, the client 321, client 322, and client 323 to the single game 32, and the client 331 to the single game 33.

In some embodiments, referring to FIG. 3C, FIG. 3C is a flow diagram of a data processing method for a virtual scene provided by an embodiment of this application. Step 1011 shown in FIG. 3B may be implemented by steps 10111 to 10112 shown in FIG. 3C, which will be described below in conjunction with steps 10111 to 10112 shown in FIG. 3C.

Step 10111: Start to run the first single game in response to the plurality of clients connecting to the service process and the number of the plurality of clients being greater than or equal to the opening threshold, and send the opening instructions to a first number of clients, the opening instructions being used for the first number of clients to access the first single game.

As an example, referring to FIG. 4B, FIG. 4B is a schematic diagram of a data processing method for a virtual scene provided by an embodiment of this application. When the opening threshold is set to 2 and the closing threshold is set to 3, the service process 45 starts running the first single game 46 in response to the client 461, the client 462, the client 463, the client 471, the client 472, the client 473, the client 481, and the client 482 connecting to the service process 45 and the number (8) of clients being greater than the opening threshold (2); the service process 45 sends opening instructions to a first number (assumed to be 3) of clients (for example, the client 461, the client 462, and the client 463) to enable the client 461, the client 462, and the client 463 to access the first single game 46.

Step 10112: Start to run a $(t+1)^{th}$ single game in response to the number of the clients accessing a $t^{th}$ single game being equal to the closing threshold and the number of the clients not yet accessing the first to $t^{th}$ single games being greater than or equal to the opening threshold, and access at least part of the clients not yet accessing the first to $t^{th}$ single games to the $(t+1)^{th}$ single game.

As an example, referring to FIG. 4B, when the opening threshold is set to 2 and the closing threshold is set to 3, the service process 45 starts running the third single game 48 in response to the number (3) of clients accessing the second single game 47 being equal to the closing threshold 3 and the number of clients (client 481 and client 482) not yet accessing the first to second single games being greater than or equal to the opening threshold 2, and access clients 481 and 482 not yet accessing the first single game 46 and the second single game 47 to the third single game.

In some embodiments, the above step 10112 is performed by iterating t incrementally, $1 \le t \le T$, T being an upper limit of the number of the single games that the service process can run.

Thus, by setting an opening threshold and a closing threshold, when a plurality of clients access a plurality of single games, each single game is guaranteed to access by a certain number of clients, thereby realizing that the plurality of clients are connected to the plurality of single games. By accessing the plurality of clients to the plurality of single games, and the plurality of single games sharing a service process, the number of service processes is significantly less than the number of single games, namely, the number of service processes is significantly reduced. Since the size of a memory occupied by static resources is positively related to the number of service processes, the significant reduction in the number of service processes significantly reduces the memory space occupation of the static resources, effectively reducing data redundancy on the server.

Continuing with FIG. 3A, the following steps are performed. Step 102: Allocate static resource masks corresponding to the static resources to the plurality of clients.

In some embodiments, the static resource masks are used for sharing the static resources among the plurality of single games. The service process ensures the sharing of the static resources among different single games by allocating the same static resource masks corresponding to the static resources to the plurality of clients, with the static resource masks allocated to the plurality of clients being the same.

As an example, referring to FIG. 4A, the service process 41 allocates static resource masks corresponding to the static resources to the client 421, client 422, client 431, client 432, client 441, and client 442.

As an example, referring to FIG. 4B, the service process 45 allocates static resource masks corresponding to the static resources to the client 461, client 462, client 463, client 471, client 472, client 473, client 481, and client 482.

In some embodiments, the above step 102 may be achieved by the following manners: allocating static resource masks with a value of 0 to the plurality of clients; and That is, the value of the static resource masks may be 0.

Step 103: Allocate dynamic resource masks correspond-ing to the dynamic resources to the plurality of clients.

In some embodiments, the dynamic resource masks are used for isolating the dynamic resources among the plurality of single games. By allocating different dynamic resource masks corresponding to the dynamic resources to the plu-rality of clients, the service process ensures complementary visibility of the dynamic resources among different single games, thereby achieving isolation. The dynamic resource masks allocated to the clients accessing same single games are the same, and the dynamic resource masks allocated to the clients accessing different single games are different.

As an example, referring to FIG. 4A, first dynamic resource masks corresponding to the dynamic resources are allocated to the client 421 and the client 422; the first dynamic resource masks are dynamic resource masks cor-responding to the single game 42, and the first dynamic resource masks allocated to the client 421 and the client 422 are the same. Second dynamic resource masks correspond-ing to the dynamic resources are allocated to the client 431 and the client 432; the second dynamic resource masks are dynamic resource masks corresponding to the single game 43, and the second dynamic resource masks allocated to the client 431 and the client 432 are the same. The first dynamic resource masks are different from the second dynamic resource masks.

As an example, referring to FIG. 4B, third dynamic resource masks corresponding to the dynamic resources are allocated to the client 461, client 462 and client 463; the third dynamic resource masks are dynamic resource masks corresponding to the single game 46, and the third dynamic resource masks allocated to the client 461, the client 462, and the client 463 are the same. Fourth dynamic resource masks corresponding to the dynamic resources are allocated to the client 471, the client 472, and the client 473; the fourth dynamic resource masks are dynamic resource masks cor-responding to the single game 47, and the fourth dynamic resource masks allocated to the client 471, the client 472, and the client 473 are the same. The third dynamic resource masks are different from the fourth dynamic resource masks.

In some embodiments, the above step 103 may be achieved by the following manners: allocating dynamic resource masks with a value of m to clients accessing an $m^{th}$ single game, m having a value range of 1≤m≤M, and M being an upper limit of the number of the single games that the service process can run.

The dynamic resource masks allocated to the clients accessing same single games are the same, and the dynamic resource masks allocated to the clients accessing different single games are different.

As an example, referring to FIG. 4A, dynamic resource masks with a value of 1 are allocated to the client 421 and the client 422 accessing a first single game 42. Dynamic resource masks with a value of 2 are allocated to the client 431 and the client 432 accessing a second single game 43. Dynamic resource masks with a value of 3 are allocated to the client 441 and the client 442 accessing a third single game 44.

As an example, referring to FIG. 4B, dynamic resource masks with a value of 1 are allocated to the client 461, the client 462, and the client 463 accessing a first single game 46. Dynamic resource masks with a value of 2 are allocated to the client 471, the client 472, and the client 473 accessing a second single game 47. Dynamic resource masks with a value of 3 are allocated to the client 481 and the client 482 accessing a third single game 48.

Step 104: Share the static resources among the plurality of single games based on the allocating static resource masks corresponding to the static resources to the plurality of clients.

In some embodiments, since the static resource masks corresponding to the static resources that are allocated to the plurality of clients are the same, the sharing of the static resources among different single games may be performed by the same static resource masks. Clients among different single games share the same static resources, that is, the service process sends the same static resources to each client.

In this way, by allocating the same static resource masks corresponding to the static resources to each client, the static resources sent by the service process to each client is the same, realizing that all the clients among different single games share the same static resources, thus effectively avoiding the redundant loading of the static resources.

In some embodiments, referring to FIG. 3B, FIG. 3B is a flow diagram of a data processing method for a virtual scene provided by an embodiment of this application. Step 104 shown in FIG. 3A may be implemented by steps 1041 to 1042 shown in FIG. 3B, which will be described below in conjunction with steps 1041 to 1042 shown in FIG. 3B.

Step 1041: Receive a static resource request sent by any one of the plurality of clients.

As an example, referring to FIG. 4A, the service process 41 receives a static resource request sent by the client 421 of a plurality of clients, the static resource request carrying static resource masks.

As an example, referring to FIG. 4B, the service process 45 receives a static resource request sent by a client 471 of the plurality of clients, the static resource request carrying static resource masks.

Step 1042: Query, based on the static resource masks carried in the static resource request, that other clients in the plurality of clients are allocated with same static resource masks, determine that the plurality of clients share the static resources, and send same static resources to the any one of the plurality of clients.

As an example, referring to FIG. 4A, based on the static resource masks carried in the static resource request sent by the client 421, the service process 41 queries that the static resource masks allocated to the client 422, the client 431, the client 432, the client 441, and the client 442 are the same as the static resource masks carried in the static resource request sent by the client 421, and determines to send the same static resources to any one of the client 421, the client 422, the client 431, the client 432, the client 441, and the client 442. Therefore, the static resource sharing of the plurality of clients among different single games is realized, and the memory space occupation of the static resources is saved.

Step 105: Isolate the dynamic resources among the dif-ferent single games based on the allocating dynamic resource masks corresponding to the dynamic resources to the plurality of clients.

The isolating includes physical isolation and visual field isolation. The physical isolation is used for allocating same horizontal axis coordinates, longitudinal axis coordinates, and vertical axis coordinates for the dynamic resources within the field of view of the clients of any two different single games. The visual field isolation is used for making the dynamic resources of two clients of different single games invisible to each other.

In some embodiments, referring to FIG. 3B, FIG. 3B is a flow diagram of a data processing method for a virtual scene provided by an embodiment of this application. Step 105 shown in FIG. 3A may be implemented by steps 1051 to 1053 shown in FIG. 3B, which will be described below in conjunction with steps 1051 to 1053 shown in FIG. 3B.

Step 1051: Receive a dynamic resource update request sent by a first client of the plurality of clients.

The dynamic resource update request carries operation information of the first client for dynamic resources and dynamic resource masks allocated to the first client.

As an example, referring to FIG. 4A, the service process 41 receives a dynamic resource update request sent by a first client 431 of the plurality of clients; the dynamic resource update request carries operation information of the first client 431 for the dynamic resources, for example, when the dynamic resources are virtual bullets, the first client 431 determines, in responding to a control operation of a user triggering a virtual shooting prop to emit the virtual bullets, the control operation being used for triggering the virtual shooting prop to emit the virtual bullets, the operation information of the first client 431 for the dynamic resources (the virtual bullets), and generates the dynamic resource update request based on the operation information for the dynamic resources. Thus, the dynamic resource update request received by the service process 41 carries the operation information of the first client 431 for the dynamic resources and the dynamic resource masks allocated to the first client 431.

As an example, referring to FIG. 4B, the service process 45 receives a dynamic resource update request sent by the first client 472 of the plurality of clients; the dynamic resource update request carries operation information of the first client 472 for the dynamic resources, for example, when the dynamic resources are characters controlled by a player, the first client 431 determines, in responding to a control operation of the player for the character, the control operation being used for changing the states (for example, the character is displaced) of the characters, operation information (for example, triggering the movement position of the character) of the first client 431 for the dynamic resources (the characters), and generates a dynamic resource update request based on the operation information for the dynamic resources. Thus, the dynamic resource update request received by the service process 45 carries the operation information of the first client 431 for the dynamic resources and the dynamic resource masks allocated to the first client 431.

Step 1052: Update the dynamic resources based on the operation information to obtain updated dynamic resources.

As an example, referring to FIG. 4A, when the dynamic resources are characters controlled by a player, the first client 431 changes the states (for example, the characters are displaced) of the characters in response to the control operation of the player for the characters, determines the operation information (for example, the characters are displaced) of the first client 431 for the dynamic resources (the characters), and updates the dynamic resources (the characters) based on the operation information (the characters are displaced) to obtain updated dynamic resources. Then position coordinates of the updated characters are changed compared with the characters before the update.

As an example, referring to FIG. 4A, when the dynamic resources are virtual bullets, the first client 431 determines, in responding to the control operation of the user triggering the virtual shooting prop to launch the virtual bullets, the control operation being used for changing the states (for example, adjusting from non-launch states to launch states) of the virtual bullets, the operation information (for example, launching the virtual bullets) of the first client 431 for the dynamic resources (virtual bullets), and updates the dynamic resources (virtual bullets) based on the operation information (virtual bullet launching) to obtain the updated dynamic resources. Then position coordinates and launch states of the updated virtual bullets are changed compared with the virtual bullets before the update.

Step 1053: Determine, based on the dynamic resource masks allocated to the first client, at least one second client accessing a same single game and having a field of view at least partially same as the first client.

As an example, the same field of view characterizes the characters in two clients of the same single game being visible to each other, and the same field of view may be that the fields of view are identical or that the fields of view are partially identical. Referring to FIG. 5D, FIG. 5D is an effect diagram of a data processing method for a virtual scene provided by an embodiment of this application. In the perspective of a virtual character 8, a virtual character 7 may be observed, and then the client corresponding to the virtual character 7 and the client corresponding to the virtual character 8 have the same field of view.

As an example, referring to FIG. 4A, based on the dynamic resource mask allocated to the first client 431, it is determined that the client 432 access the same single game as the first client 431, and it is determined whether the field of view of the client 432 is the same as that of the first client 431; when the field of view of the first client 431 is the same as that of the client 432, the client 432 is determined as a second client.

As an example, referring to FIG. 4B, based on the dynamic resource mask allocated by the first client 472, it is determined that the client 471 and the client 473 access the same single game as the first client 472, and it is determined whether the fields of view of the client 471 and the client 473 are the same as that of the first client 472; when the field of view of the first client 472 is the same as those of the client 473 and the client 471, the client 471 and the client 473 are determined as the second clients.

In some embodiments, when a virtual scene may be completely displayed in a plurality of clients at once, the above step 1053 may be implemented by the following manners: querying, based on the dynamic resource masks assigned to the first client, at least one client assigned same dynamic resource masks as the first client from the plurality of clients as the second client.

In this way, since clients accessing the same single game have the same dynamic resource masks, a target client which is the same as the dynamic resource masks of the first client may be determined based on the dynamic resource masks allocated to the first client, and the target client is determined to be a client accessing the same single game as the first client, so that the clients accessing the same single game are queried through the dynamic resource masks, facilitating the subsequent visual field isolation and physical isolation of dynamic resources for clients of different single games.

In some embodiments, when a portion of a virtual scene is displayed in a plurality of clients at once, see FIG. 3D. FIG. 3D is a flow diagram of a data processing method for a virtual scene provided by an embodiment of this application. Step 1053 shown in FIG. 3B may be implemented by steps 10531 to 10533 shown in FIG. 3D, which will be described below in conjunction with steps 10531 to 10533 shown in FIG. 3D.

Step 10531: Query, based on the dynamic resource masks assigned to the first client, the at least one client assigned the same dynamic resource masks as the first client from the plurality of clients.

As an example, referring to FIG. 4A, the service process 41 queries, based on the dynamic resource masks allocated to the first client 431, clients that are allocated the same dynamic resource masks as the first client 431, such as the client 432, from the client 421, client 422, client 432, client 441, and client 442.

As an example, referring to FIG. 4B, the service process 45 queries, based on the dynamic resource masks allocated to the first client 472, clients that are allocated the same dynamic resource masks as first client 472, such as the client 471 and client 473, from client 461, client 462, client 463, client 471, client 473, client 481, and client 482.

Step 10532: Determine a distance between dynamic resources currently displayed in the first client and dynamic resources corresponding to the at least one client in the virtual scene.

As an example, referring to FIG. 5D and FIG. 4A, a distance between the virtual character 7 currently displayed in the first client 431 and the virtual character 8 corresponding to the client 432 in the virtual scene, that is, the distance between the virtual character 7 and the virtual character 8 in the virtual scene as shown in FIG. 5D is determined; the distance refers to a length spanned in a 2D space or a 3D space of the virtual scene.

As an example, referring to FIG. 4B, a distance between the dynamic resources currently displayed in the first client 472 and the dynamic resources corresponding to the client 471 in the virtual scene, and a distance between the dynamic resources currently displayed in the first client 472 and the dynamic resources corresponding to the client 473 in the virtual scene are determined.

Step 10533: Take at least one client with the distance less than a visual field distance threshold as the second client.

In some embodiments, the visual field distance threshold is a minimum distance that ensures that dynamic resources currently displayed in two clients of the same single game are invisible to each other. When the distance between the dynamic resources currently displayed in two clients of the same single game is less than the visual field distance threshold, the dynamic resources currently displayed in the two clients of the same single game may be visible to each other. When the distance between the dynamic resources currently displayed in the two clients of the same single game is greater than or equal to the visual field distance threshold, the dynamic resources currently displayed in the two clients of the same single game are mutually invisible.

As an example, referring to FIG. 4A and FIG. 5D, the client 432 is determined to be the second client when the queried at least one client allocated to the same dynamic resource masks as the first client 431 is the client 432, and when the distance between the virtual character 7 currently displayed in the first client 431 and the virtual character 8 currently displayed in the client 432 in the virtual scene is less than the visual field distance threshold. The client 432 is not determined to be the second client when the distance between the virtual character 7 currently displayed in the first client 431 and the virtual character 8 corresponding to the client 432 in the virtual scene is greater than or equal to the visual field distance threshold.

As an example, referring to FIG. 4B, the client 471 is determined to be the second client when the queried at least one client allocated to the same dynamic resource masks as the first client 472 is the client 471 and the client 473 and when the distance between the dynamic resources currently displayed in the first client 472 and the dynamic resources currently displayed in the client 471 in the virtual scene is less than the visual field distance threshold. The client 473 is determined to be the second client when the distance between the dynamic resources currently displayed in the first client 472 and the dynamic resources currently displayed in the client 473 in the virtual scene is less than the visual field distance threshold. The client 471 is not determined to be the second client when the distance between the dynamic resources currently displayed in the first client 472 and the dynamic resources currently displayed in the client 471 in the virtual scene is greater than or equal to the visual field distance threshold. The client 473 is not determined to be the second client when the distance between the dynamic resources currently displayed in the first client 472 and the dynamic resources currently displayed in the client 473 in the virtual scene is greater than or equal to the visual field distance threshold.

In some embodiments, the updated dynamic resources are sent to the first client when there is no second client accessing the same single game as the first client in the plurality of clients. The updated dynamic resources are sent to the first client when there is at least one client accessing the same single game as the first client in the plurality of clients, and the field of view of the at least one client is different from that of the first client.

As an example, referring to FIG. 4C, the updated dynamic resources are sent to the first client 331 when there is no second client accessing the same single game (single game 33) as the first client 331 in the plurality of clients (for example, client 311, client 312, client 313, client 321, client 322, and client 323).

As an example, referring to FIG. 4B, the updated dynamic resources are sent to the first client 472 when there is at least one client (client 471 and client 473) accessing the same single game as the first client 472 in the plurality of clients, and the client 471 and client 473 have different fields of view from the first client 472.

In this way, at least one second client accessing the same single game and having the same field of view as the first client is determined from the two dimensions of the visual field distance threshold and the dynamic resource threshold; when there is no second client satisfying the condition, the updated dynamic resources are sent only to the first client, thereby achieving isolation of the dynamic resources between the first client and clients other than the first client.

Step 1054: Send the updated dynamic resources to the first client and the at least one second client.

In this way, at least one second client accessing the same single game and having the same field of view as the first client is determined from the two dimensions of the visual field distance threshold and the dynamic resource threshold, thus realizing the sharing of the dynamic resources between the first client and the second client, and realizing the isolation of the dynamic resource between the first client and the clients other than the second client.

In some embodiments, referring to FIG. 3E, FIG. 3E is a flow diagram of a data processing method for a virtual scene provided by an embodiment of this application. Step 105 shown in FIG. 3A may be implemented by steps 1055 to 1056 shown in FIG. 3E, which will be described below in conjunction with steps 1055 to 1056 shown in FIG. 3E.

Step 1055: Determine, when positions of the dynamic resources within a field of view of a first client in the virtual scene coincide with positions of the dynamic resources within a field of view of a second client in the virtual scene, a relationship of single games accessed by the first client and the second client based on the dynamic resource masks allocated to the first client and the second client.

The first client and the second client are any two of the plurality of clients.

In some embodiments, before performing the above step 1055, it may be determined whether positions of the dynamic resources within a field of view of a first client in the virtual scene coincide with positions of the dynamic resources within a field of view of a second client in the virtual scene by the following manners: receiving a dynamic resource update request sent by a first client of the plurality of clients, the dynamic resource update request sent by the first client carrying operation information of the first client for the dynamic resources and dynamic resource masks allocated to the first client; receiving a dynamic resource update request sent by a first client of the plurality of clients, the dynamic resource update request sent by the second client carrying operation information of the first client for the dynamic resources and dynamic resource masks allocated to the first client; and determining whether positions of the dynamic resources within a field of view of a first client in the virtual scene coincide with positions of the dynamic resources within a field of view of a second client in the virtual scene based on the operation information of the second client for the dynamic resources and the operation information of the first client for the dynamic resource.

In some embodiments, position coincidence means that the 2D coordinates of the dynamic resources within the field of view of any two clients are the same in the virtual scene, that is, the dynamic resources within the field of view of the any two clients meet in the virtual scene.

In some embodiments, the relationship between the single games accessed by the first client and the second client characterizes whether the single games accessed by the first client and the second client are different single games. That is, the relationship between the single games accessed by the first client and the second client may characterize that the single games accessed by the first client and the second client are the same single game, and the relationship between the single games accessed by the first client and the second client may also characterize that the single games accessed by the first client and the second client are different single games.

In some embodiments, the determining a relationship of single games accessed by the first client and the second client based on the dynamic resource masks allocated to the first client and the second client in the above step 1055 may be achieved by the following manners: determining that the first client and the second client access a same single game when the dynamic resource masks allocated to the first client and the second client are the same; and determining that the first client and the second client access the different single games when the dynamic resource masks allocated to the first client and the second client are different.

As an example, referring to FIG. 4A, when the first client is a client 421 in the single game 42, and the second client is a client 431 in the single game 43, namely, the dynamic resource masks allocated to the first client and the second client are different, it is determined that the first client and the second client access different single games.

As an example, referring to FIG. 4C, when the first client is a client 331 in the single game 33 and the second client is a client 321 in the single game 32, namely, the dynamic resource masks allocated to the first client and the second client are different, it is determined that the first client and the second client access different single games.

Step 1056: Physically isolate the dynamic resources corresponding to the first client and the second client when the relationship characterizes that the single games accessed by the first client and the second client are different.

The physically isolating is used for allocating same horizontal axis coordinates, longitudinal axis coordinates, and vertical axis coordinates for the dynamic resources within the field of view of the first client and the dynamic resources within the field of view of the second client.

As an example, referring to FIG. 4A, when the first client is a client 421 in the single game 42, and the second client is a client 431 in the single game 43, the relationship characterizes that the single games accessed by the first client and the second client are different single games, and the dynamic resources corresponding to the first client and the second client are physically isolated, namely, allocating same horizontal axis coordinates, longitudinal axis coordinates, and vertical axis coordinates for the dynamic resources within the field of view of the first client and the dynamic resources within the field of view of the second client. The single games accessed by the first client and the second client are different single games, characterizing that the first client and the second client networks are not related; the single games accessed by the first client and the second client are the same single game, characterizing that the first client and the second client networks are related.

As an example, referring to FIG. 5F, the physical isolation between the virtual character 11 and the virtual character 12 is manifested in that the virtual character 11 and the virtual character 12 are invisible to each other and may cross each other; the virtual character 11 and the virtual character 12 are allocated the same horizontal axis coordinate, longitudinal axis coordinate, and vertical axis coordinate.

In this way, by allocating the same horizontal axis coordinate, longitudinal axis coordinate, and vertical axis coordinate to the dynamic resources within the field of view of the first client and the dynamic resources within the field of view of the second client, the dynamic resources within the field of view of the first client and the dynamic resources within the field of view of the second client can completely overlap, thereby achieving physical isolation of the dynamic resources corresponding to the first client and the second client.

In some embodiments, the same horizontal axis coordinates and longitudinal axis coordinates, and different vertical axis coordinates are allocated for the dynamic resources within the field of view of the first client and the dynamic resources within the field of view of the second client when the relationship characterizes that the single games accessed by the first client and the second client are the same.

As an example, referring to FIG. 5E, the absence of physical isolation between the virtual character 9 and the virtual character 10 is manifested in that the virtual character 9 and the virtual character 10 are visible to each other and cannot cross each other; the virtual character 9 and the virtual character 10 are allocated the same horizontal axis coordinate, longitudinal axis coordinate, and different vertical axis coordinates.

In some embodiments, after the dynamic resources corresponding to the first client and the second client are physically isolated, the physically isolated dynamic resources corresponding to the first client may also be sent to the first client. The physically isolated dynamic resources corresponding to the second client may be sent to the second client.

As an example, referring to FIG. 4A, when the first client is the client 421 and the second client is the client 431, after the dynamic resources corresponding to the client 421 and the client 431 are physically isolated, the physically isolated dynamic resources corresponding to the client 421 may also be sent to the client 421. The physically isolated dynamic resource corresponding to the client 431 may be sent to the client 431.

As an example, referring to FIG. 4B, when the first client is the client 462 and the second client is the client 471, after the dynamic resources corresponding to the client 462 and the client 471 are physically isolated, the physically isolated dynamic resources corresponding to the client 462 may also be sent to the client 462. The physically isolated dynamic resource corresponding to the client 471 may be sent to the client 471.

Figure 3F:
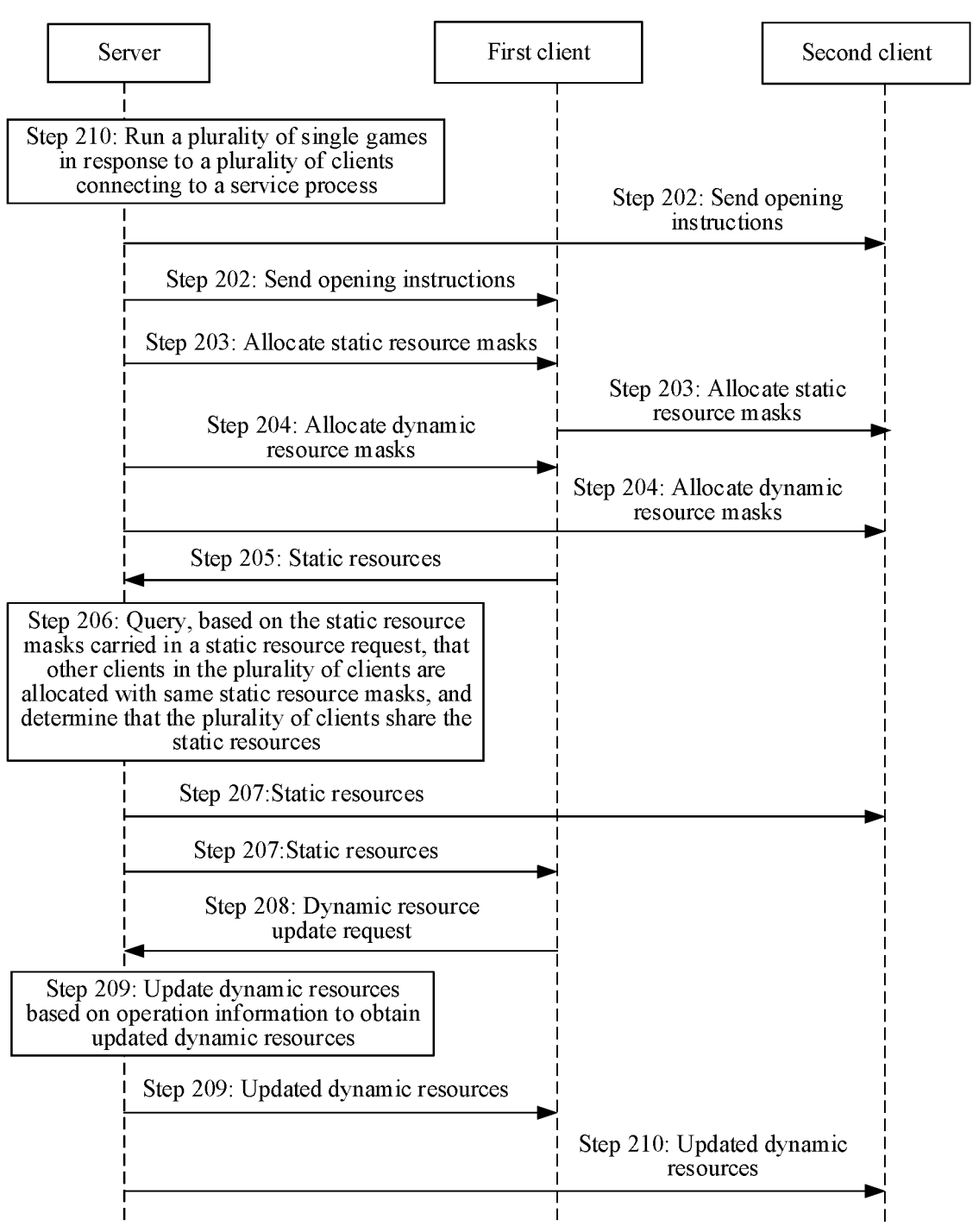

Referring to FIG. 3F, FIG. 3F is a flow diagram of a data processing method for a virtual scene provided by an embodiment of this application. There will be an illustration in conjunction with steps 201 to 210 shown in FIG. 3F; the execution subjects of steps 201 to 210 may be the foregoing server or terminal device.

Step 201: A server runs a plurality of single games in response to a plurality of clients connecting to a service process.

Step 202: The server sends opening instructions to the plurality of clients.

Step 203: The server allocates static resource masks corresponding to static resources to the plurality of clients.

Step 204: The server allocates dynamic resource masks corresponding to dynamic resources to the plurality of clients.

Step 205: The server receives a static resource request sent by any one of the plurality of clients.

Step 206: The server queries, based on the static resource masks carried in the static resource request, that other clients in the plurality of clients are allocated with same static resource masks, and determines that the plurality of clients share the static resources.

Step 207: The server sends same static resources to any one of the plurality of clients.

Step 208: The server receives a dynamic resource update request sent by a first client of the plurality of clients.

Step 209: The server updates the dynamic resources based on operation information to obtain updated dynamic resources.

Step 210: The server sends the updated dynamic resources to the first client and at least one second client.

In some embodiments, referring to FIG. 3G, FIG. 3G is a flow diagram of a data processing method for a virtual scene provided by an embodiment of this application. There will be an illustration in conjunction with steps 301 to 303 shown in FIG. 3G; the execution subjects of steps 301 to 303 may be the foregoing terminal device.

Step 301: Connect to a service process of a server via a first client in a terminal device, and access one single game of a plurality of single games created by the server for a plurality of clients in response to opening instructions sent by the server.

In some embodiments, the plurality of single games may share a service process, the service process including static resources and dynamic resources of the virtual scene, and the plurality of clients includes a first client.

Step 302: The first client receives a static resource mask sent by the server for the static resources.

In some embodiments, the static resource masks sent by the server to different clients are the same.

Step 303: The first client receives a dynamic resource mask sent by the server for the dynamic resources.

In some embodiments, the dynamic resource masks sent by the server to clients accessing the same single game are the same, and the dynamic resource masks sent to clients accessing different single games are different.

The static resource masks are used for sharing the static resources among the plurality of single games, and the dynamic resource masks are used for isolating the dynamic resources among the different single games.

In some embodiments, the isolating includes visual field isolation; and after performing the above step 303, the visual field isolation may be achieved by the following manners: sending a dynamic resource update request to the server, the dynamic resource update request carrying operation information of the first client for the dynamic resources and dynamic resource masks allocated to the first client; and receiving updated dynamic resources sent by the server, the server sending the updated dynamic resources to the first client and at least one client accessing a same single game and having a same field of view as the first client.

In this way, the server sends the updated dynamic resources to the first client and at least one client accessing a same single game and having a same field of view as the first client, so that the first client and the at least one client accessing a same single game and having a same field of view as the first client are visible to each other, and the first client and a client accessing different single games from the first client are invisible to each other, achieving the visual field isolation between the first client and the client accessing the different single game from the first client.

In some embodiments, the isolating includes physical isolation; and after the first client sends a dynamic resource update request to the server, the physical isolation may be achieved by the following manners: receiving horizontal axis coordinates, longitudinal axis coordinates, and vertical axis coordinates allocated by server for dynamic resources within field of view of the first client, the server allocating, when positions of the dynamic resources within the field of view of the first client in the virtual scene coincide with positions of the dynamic resources within a field of view of a second client in the virtual scene and the single games accessed by the first client and the second client are different, same horizontal axis coordinates, longitudinal axis coordinates, and vertical axis coordinates for the dynamic resources within the field of view of the first client and the dynamic resources within the field of view of the second client.

In this way, the server allocates, when positions of the dynamic resources within the field of view of the first client in the virtual scene coincide with positions of the dynamic resources within a field of view of a second client in the virtual scene and the single games accessed by the first client and the second client are different, same horizontal axis coordinates, longitudinal axis coordinates, and vertical axis coordinates for the dynamic resources within the field of view of the first client and the dynamic resources within the field of view of the second client, thereby achieving physical isolation between the first client and the second client.

On the one hand, by accessing the plurality of clients to the plurality of single games, and the plurality of single games sharing a service process, the number of service processes is significantly less than the number of single games, namely, the number of service processes is significantly reduced. Since the size of a memory occupied by static resources is positively related to the number of service processes, the significant reduction in the number of service processes significantly reduces the memory space occupation of the static resources, effectively reducing data redundancy. On the other hand, the plurality of single games share a service process; and by allocating corresponding static resource masks and dynamic resource masks to the clients in different single games, static resource sharing and dynamic resource isolation are realized among the plurality of single games. In this manner, dynamic resource isolation and static resource sharing among different single games may be achieved while effectively reducing data redundancy on the server.

Referring to FIG. 5Q, FIG. 5Q is a schematic diagram of a data processing method for a virtual scene provided by an embodiment of this application. With the data processing method for a virtual scene provided by the embodiments of this application, a plurality of single games multiplexing a process may be implemented, for example, a single game 04, a single game 05, and a single game 06 multiplex a process 014. Thus, by multiplexing the same process with the plurality of single games, the following advantageous effects may be produced:

(1) Reduced memory occupation: The plurality of single games share the same static resources, effectively reducing redundant loading of the static resources.

(2) Reduced CPU load: Compared with the related art, the number of processes is significantly reduced. On the one hand, the physical computation and rendering computation overhead of the processes are effectively saved. On the other hand, it effectively reduces L3 cache miss and cache overhead.

(3) The plurality of single games rolling multiplexing a process: The process supports rolling multiplexing for the plurality of single games, avoiding the redundant overhead of loading and unloading large resources.

In the following, exemplary applications of the embodiments of this application in an application scene of an actual online game will be described.

The embodiments of this application may have the following application scenes, for example, in an application scene of an actual online game. Referring to FIGS. 5A to 5D, FIGS. 5A to 5D are effect diagrams of a data processing method for a virtual scene provided by an embodiment of this application. Referring to FIG. 5A, in the virtual scene of the online game shown in FIG. 5A, the virtual character 1 controlled by player A and the virtual character 2 controlled by player B are in the same single game; the virtual character 3 controlled by player C and the virtual character 1 and virtual character 2 belong to different single games. Virtual characters within different single games are invisible to each other, for example, the virtual character 1 cannot see the virtual character 3 but can see the virtual character 2, and virtual character 3 cannot see the virtual character 1 and virtual character 2. Specifically, referring to FIG. 5B, in the virtual scene from the perspective of the virtual character 4 shown in FIG. 5B, the virtual character 4 cannot see the virtual character 1 and virtual character 2 shown in FIG. 5A. Referring to FIG. 5C, in the virtual scene from the perspective of the virtual character 5 shown in FIG. 5C, the virtual character 5 can see the virtual character 6 but cannot see the virtual character 3 shown in FIG. 5A. Referring to FIG. 5D, in the virtual scene from the perspective of the virtual character 8 shown in FIG. 5D, the virtual character 8 can see the virtual character 7 but cannot see the virtual character 3 shown in FIG. 5A. That is, the characters in different single games are invisible to each other, and the characters in the same single game are visible to each other. With the data processing method for a virtual scene provided by the embodiments of this application, clients at different single games allocate same single game masks (namely, the dynamic resource masks described above) for the dynamic resources within each single game through sharing a service process of a network server, allocate different single game masks for the dynamic resources within the different single games, achieving visual field isolation and physical isolation of the dynamic resources within the different single games through the allocation of the single game masks. Therefore, a large amount of bearing space is released for the network server, effectively improving the bearing capacity of the network server.

As an example, referring to FIG. 5E, FIG. 5E is an effect diagram of a data processing method for a virtual scene provided by an embodiment of this application. The single game masks of the virtual character 9 (namely, the dynamic resource masks described above) are the same as the single game masks of the virtual character 10, that is, the virtual character 9 and the virtual character 10 are in the same single game; when the positions of the virtual character 9 and the virtual character 10 coincide (the 2D coordinates are the same), that is, there is a physical collision between the virtual character 9 and the virtual character 10, and the virtual character 9 and the virtual character 10 determine to exist mutually; in space, the virtual character 9 and the virtual character 10 are stacked up and down in the same 2D coordinate, that is, when the virtual character 9 and the virtual character 10 are in the same 2D coordinate, collisions may occur and there is no way to cross each other, that is, characters of the same single game may perceive each other's existence.

As an example, referring to FIG. 5F, FIG. 5F is an effect diagram of a data processing method for a virtual scene provided by an embodiment of this application. The single game masks of the virtual character 11 and the single game masks of the virtual character 12 are different, namely, the virtual character 11 and the virtual character 12 are in different single positions; when the positions of the virtual character 11 and the virtual character 12 coincide (the 2D coordinates are the same), namely, there is no physical collision between the virtual character 11 and the virtual character 12, and the virtual character 11 and the virtual character 12 mutually determine that they do not exist; and in space, it appears that the virtual character 11 and the virtual character 12 may coincide in the same 2D coordinate, namely, when the virtual character 11 and the virtual character 12 are in the same 2D coordinate, collisions do not occur and the two may cross each other, that is, the characters of different single games cannot perceive each other's existence.

Referring to FIGS. 5G to 5J, FIGS. 5G to 5J are effect diagrams of a data processing method for a virtual scene provided by an embodiment of this application. Static resources refer to resources shared by different clients, and the static resources may be shared by different clients. In the online game, the static resources are non-interactive resources, that is, resources whose states cannot be changed during the game, for example, the static resources may be a virtual building 51 in the online game as shown in FIG. 5G, and the static resources may also be a virtual city landscape 52 in the online game as shown in FIG. 5H. Dynamic resources refer to different resources of different clients, and the dynamic resources may be exclusive to each client. In the online game, the dynamic resources are interactive resources, that is, resource whose states may change during the game, for example, the dynamic resources may be a virtual character 53 controlled by a player as shown in FIG. 5I, and a virtual bullet 54 in the online game as shown in FIG. 5J.

In this way, characters are invisible to each other in the field of view of different single games, and characters are visible to each other in the field of view of the same single game. Dynamically, characters in different single games are physically isolated, and characters in the same single game are physically determined to exist. Namely, the characters within the same single game may be perceived mutually, and the characters among different single games cannot be perceived mutually, and then the same process is multiplexed to realize the simultaneous operation of the plurality of single games.

A concrete implementation process of the data processing method for the virtual scene provided by the embodiments of this application will be described below.

First, a specific generating manner of the single game masks (that is, the dynamic resource masks and the static resource masks described above) is described. Referring to FIG. 5K, FIG. 5K is a flow diagram of a data processing method for a virtual scene provided by an embodiment of this application. The generating manner of the single game masks is described below in conjunction with steps 501 to 509 shown in FIG. 5K.

Step 501: A server process is initialized.

Step 502: A first client connects to the process.

Step 503: A second client connects to the process.

Step 504: The server process generates single game masks.

In some embodiments, the single game masks of dynamic resources of each single game (that is, the dynamic resource masks described above) are the same, and the single game masks of dynamic resources of different single games are different. That is, the same single game masks are set for all dynamic resources within a single game, and the characters are a subset of the dynamic resources.

The single game masks for each dynamic resource are recorded in variables of each dynamic resource, and the maximum value of the single game masks may be 256. The expression of the generation rule of the single game masks may be:

$$view\_mask\_id=battle\_count \qquad (1)$$

view_mask_id represents single game masks of dynamic resources, and battle_count represents the number of single games created by a process.

Step 505: A server process returns single game masks to a second client.

Step 506: The server process returns the single game masks to a first client. Step 507: The server process starts a single game.

The process starts the single game when opening conditions are met. The opening conditions may be that the number of characters in the single game is greater than or equal to two, that is, the number of players in the single game is greater than or equal to the lower limit threshold. The process issues the opening instructions for the client to start the first single game. When the number of single-game characters of the first single game reaches the upper limit threshold, the next single game is prepared to be started; and when the next single game meets the opening conditions, the next single game is started.

Step 508: The server process issues opening instructions to the first client.

Step 509: The server process issues the opening instructions to the second client.

Referring to FIG. 5L, FIG. 5L is a flow diagram of a data processing method for a virtual scene provided by an embodiment of this application. The synchronizing manner of process attributes is described below in conjunction with steps 510 to 514 shown in FIG. 5L.

Step 510: The server process enters a main loop.

As an example, after the process enters the main loop, the process is pushed forward.

Step 511: The server process receives uplink network packets of the clients.

As an example, the process receives uplink network packets sent by each client; the uplink network packets carry operation information of the client for the dynamic resources, and the operation information of the client for the dynamic resources may be a position moving operation for the virtual character, a shooting operation for the virtual bullet, a releasing operation for the skills of the virtual character, and the like.

Step 512: The server process performs logical processing.

As an example, after receiving the uplink network packets, the process performs logical calculation on collected operation information, for example, the logical calculation may be determining whether two different virtual characters are within the field of view of each other according to the position moving operation for the virtual character.

Step 513: The server process performs network correlation calculation.

As an example, the network correlation calculation may be to determine whether two virtual characters within the field of view have network correlation, that is, whether the two virtual characters within the field of view belong to the same single game.

As an example, referring to FIG. 5M, FIG. 5M is a flow diagram of a data processing method for a virtual scene provided by an embodiment of this application. The calculation process of the network correlation is described below from the perspective of the virtual character A (hereinafter, simply referred to as the character A) in conjunction with steps 5131 to 5134 shown in FIG. 5M.

Step 5131: The server process determines if the single game masks of any resource within the field of view of the character A are 0.

As an example, any resource within the field of view of the character A includes all dynamic resources and static resources within the field of view of the character A. The process may traverse all resources within the field of view of the character A to determine if the single game masks of any resource within the field of view of the character A is 0. When the single game masks of any resource within the field of view of the character A are 0, namely, the resources characterizing that the single game masks are 0 are static resources, since the static resources are shared by all the single games, namely, regardless of the single game in which character A is located, the character A and all the static resources have network correlation. When the single game masks of any resource within the field of view of the character A are 0, step S133 is performed. When the single game masks of any resource within the field of view of the character A are not 0, step S132 is performed.

Step 5132: The server process determines whether the single game masks of the character A are equal to the single game masks of any resource.

As an example, when the single game masks of any resource within the field of view of the character A are not 0, the process determines whether the single game masks of the character A are the same as the single game masks of any resource; and when the single game masks of the character A are equal to the single game masks of any resource, it is characterized that the single game to which the resource belongs are the same as the single game to which the character A belongs, and step S133 is performed. When the single game masks of the character A are different from the single game masks of any resource, it is characterized that the single game to which the resource belongs are different from the single game to which the character A belongs, and step S134 is performed.

Step S133: Determine that the network is relevant.

As an example, resources within the field of view of the character A are determined to be relevant to the character A network.

Step S134: Determine that the network is irrelevant.

As an example, resources within the field of view of the character A are determined to be irrelevant to the character A network.

In this manner, the dynamic resource asynchronization property among different single games is achieved based on the network correlation determination of the single game masks, thereby achieving the visual field isolation among single games.

Step 514: The server process performs attribute synchronization.

As an example, when two characters have network correlation, the processes synchronize each other's attribute information and dynamic resources to the other character.

Referring to FIG. 5N, FIG. 5N is a schematic diagram of a data processing method for a virtual scene provided by an embodiment of this application. A collision between dynamic resources may occur in a process performed by a single game, and the process determines whether the dynamic resources A collide with the dynamic resources B by determining whether the single game masks between the dynamic resources A and the dynamic resources B are the same. When the single game masks between the dynamic resources A and the dynamic resources B are the same, a collision occurs between the dynamic resources A and the dynamic resources B. When the single game masks between the dynamic resources A and the dynamic resources B are different, no collision occurs between the dynamic resources A and the dynamic resources B.

As an example, the dynamic resources A are virtual characters controlled by a player and the dynamic resources B are virtual bullets; when the virtual bullets hit the virtual characters, it is determined whether the virtual characters collide with the virtual bullets by determining whether the single game masks of the virtual characters are the same as the single game masks of the virtual bullets. When the single game masks of the virtual characters are the same as the single game masks of the virtual bullets, the virtual characters and the virtual bullets are in the same single game; and when the virtual bullets hit the characters, the virtual characters collide with the virtual bullets. When the single game masks of the virtual characters are different from the single game masks of the virtual bullets, the virtual characters and the virtual bullets are in different single games; and when the virtual bullets hit the virtual characters, the virtual characters do not collide with the virtual bullets.

Referring to FIG. 5O, FIG. 5O is a flow diagram of a data processing method for a virtual scene provided by an embodiment of this application. The determination of whether to calculate the collision process will be described below from the perspective of the character A in conjunction with steps 520 to 523 shown in FIG. 5O.

Step 520: The server determines if the single game masks of any resource within the field of view of the character A are 0.

As an example, when the single game masks of any resource within the field of view of the character A are 0, step 522 is performed. When the single game masks of any resource within the field of view of the character A are not 0, step 521 is performed. The resources with single game masks of 0 are static resources. Since the static resources are shared by all the single games, namely, any static resource may have a collision with other resources (the other resources may be static resources or dynamic resources), the resources with single game masks of 0 need to calculate a collision.

Step 521: The server determines whether the single game masks of the character A are equal to the single game masks of any resource.

As an example, when the single game masks of the character A are equal to the single game masks of any resource, step 522 is performed. When the single game masks of the character A are not equal to the single game masks of any resource, step 523 is performed.

Step 522: The server computes a collision between the character A and any resource.

Step 523: The server does not compute a collision between the character A and any resource.

In this manner, collision determination filtering through the single game masks achieves physical isolation between the single games because collision calculations need only be performed with players within the single game.

Since the size of the memory occupied by static resources is positively related to the number of processes, the static resources occupied by two processes are twice the static resources occupied by one process. When the plurality of processes contain the same static resources, the static resources are reloaded, resulting in the increase of the memory occupied by the static resources. With the data processing method for a virtual scene provided by the embodiments of this application, the plurality of single games multiplexing a process may be realized, thereby saving the number of processes, and realizing the multiplexing of the static resources.

Since the plurality of single games share the same static resources, redundant records of the static resources are effectively reduced. On the one hand, due to the reduction of the number of processes, the overhead of physical computation and rendering computation of processes is saved; the L3 cache miss is significantly reduced; and the cache overhead is effectively reduced. Since the process supports rolling multiplexing for the plurality of single games, the loading and unloading of large amounts of resources and the redundancy overhead of the construction are effectively avoided.

It is to be understood that in the embodiments of this application, relating to relevant data of static resources, dynamic resources, and the like, user permission or consent needs to be obtained when the embodiments of this application are applied to products or technologies; and collection, use, and processing of the relevant data needs to comply with relevant laws and regulations and standards of relevant countries and regions.

The following continues to illustrate an exemplary structure of a data processing apparatus 255 for a virtual scene provided by the embodiments of this application implemented as a software module. In some embodiments, as shown in FIG. 2A, a software module, stored in the data processing apparatus 255 for the virtual scene of a memory 250 may include: an access module 2551, configured to access a plurality of clients to a plurality of single games, the plurality of single games sharing a service process and the service process including static resources and dynamic resources of the virtual scene; a first allocation module 2552, configured to allocate static resource masks corresponding to the static resources to the plurality of clients, the static resource masks allocated to the plurality of clients being the same; a second allocation module 2553, configured to allocate dynamic resource masks corresponding to the dynamic resources to the plurality of clients, the dynamic resource masks allocated to the clients accessing a same single game being the same, and the dynamic resource masks allocated to the clients accessing different single games being different; a sharing module 2554, configured to share the static resources among the plurality of single games based on the allocating static resource masks corresponding to the static resources to the plurality of clients; and an isolation module 2555, configured to isolate the dynamic resources among the different single games based on the allocating dynamic resource masks corresponding to the dynamic resources to the plurality of clients.

In some embodiments, the above access module 2551 is further configured to run, in response to the plurality of clients connecting to the service process, the plurality of single games, and send opening instructions to the plurality of clients, the opening instructions being used for the plurality of clients to connect to the plurality of single games, each client connecting to one single game, and the number of accesses to each single game being greater than or equal to an opening threshold and less than or equal to a closing threshold.

In some embodiments, the above access module 2551 is further configured to: start to run the first single game in response to the plurality of clients connecting to the service process and the number of the plurality of clients being greater than or equal to the opening threshold, and send the opening instructions to a first number of clients, the opening instructions being used for the first number of clients to access the first single game; and iterate t incrementally to perform the following processing: starting to run a $(t+1)^{th}$ single game in response to the number of the clients accessing a $t^{th}$ single game being equal to the closing threshold and the number of the clients not yet accessing the first to $t^{th}$ single games being greater than or equal to the opening threshold, and accessing at least part of the clients not yet accessing the first to $t^{th}$ single games to the $(t+1)^{th}$ single game. $1 \leq t \leq T$, T is an upper limit of the number of single games that service process can run.

In some embodiments, the first allocation module 2552 is further configured to allocate static resource masks with a value of 0 to the plurality of clients. The above second allocation module 2552 is further configured to iterate m incrementally to perform the following processing: allocating dynamic resource masks with a value of m to clients accessing an $m^{th}$ single game, m having a value range of $1 \leq m \leq M$, and M being an upper limit of the number of the single games that the service process can run.

In some embodiments, the above isolating includes visual field isolation, and the above isolation module 2555 is further configured to: receive a dynamic resource update request sent by a first client of the plurality of clients, the dynamic resource update request carrying operation information of the first client for the dynamic resources and dynamic resource masks allocated to the first client; update the dynamic resources based on the operation information to obtain updated dynamic resources; determine, based on the dynamic resource masks allocated to the first client, at least one second client accessing a same single game and having a same field of view as the first client; and send the updated dynamic resources to the first client and the at least one second client.

In some embodiments, when the virtual scene may be completely displayed in a plurality of clients at once, the above isolation module 2555 is further configured to query, based on the dynamic resource masks assigned to the first client, at least one client assigned same dynamic resource masks as the first client from the plurality of clients as the second client.

In some embodiments, when a part of a virtual scene is displayed in a plurality of clients at once, the above isolation module 2555 is further configured to: query, based on the dynamic resource masks assigned to the first client, the at least one client assigned the same dynamic resource masks as the first client from the plurality of clients; determine a distance between dynamic resources currently displayed in the first client and dynamic resources corresponding to the at least one client in the virtual scene; and take at least one client with the distance less than a visual field distance threshold as the second client.

In some embodiments, the data processing apparatus 255 of the virtual scene further includes: a first sending module, configured to: send the updated dynamic resources to the first client when there is no the second client accessing the same single game as the first client in the plurality of clients; and send the updated dynamic resources to the first client when there is at least one client accessing the same single game as the first client in the plurality of clients, and the field of view of the at least one client is different from that of the first client.

In some embodiments, the isolating includes physical isolation. The above isolation module 2555 is further configured to determine, when positions of the dynamic resources within a field of view of a first client in the virtual scene coincide with positions of the dynamic resources within a field of view of a second client in the virtual scene, a relationship of single games accessed by the first client and the second client based on the dynamic resource masks allocated to the first client and the second client. The first client and the second client are any two of the plurality of clients. The dynamic resources corresponding to the first client and the second client are physically isolated when the relationship characterizes that the single games accessed by the first client and the second client are different. The physically isolating is used for allocating same horizontal axis coordinates, longitudinal axis coordinates, and vertical axis coordinates for the dynamic resources within the field of view of the first client and the dynamic resources within the field of view of the second client.

In some embodiments, the data processing apparatus 255 of the virtual scene further includes: a second sending module, configured to: send the physically isolated dynamic resources corresponding to the first client to the first client; and send the physically isolated dynamic resources corresponding to the second client to the second client.

In some embodiments, the above isolation module 2555 is further configured to: determine that the first client and the second client access a same single game when the dynamic resource masks allocated to the first client and the second client are the same; and determine that the first client and the second client access the different single games when the dynamic resource masks allocated to the first client and the second client are different.

In some embodiments, the data processing apparatus 255 of the virtual scene further includes: a third allocation module, configured to allocate the same horizontal axis coordinates and longitudinal axis coordinates, and different vertical axis coordinates for the dynamic resources within the field of view of the first client and the dynamic resources within the field of view of the second client when the relationship characterizes that the single games accessed by the first client and the second client are the same.

In some embodiments, the above sharing module 2554 is further configured to: receive a static resource request sent by any one of the plurality of clients, the static resource request carrying the static resource masks; and query, based on the static resource masks carried in the static resource request, that other clients in the plurality of clients are allocated with same static resource masks, determine that the plurality of clients share the static resources, and send same static resources to the any one of the plurality of clients.

The following continues to illustrate an exemplary structure of a data processing apparatus 455 for a virtual scene provided by the embodiments of this application implemented as a software module. In some embodiments, as shown in FIG. 2B, a software module, stored in the data processing apparatus 455 for the virtual scene of a memory 450 may include: an access module 4551, configured to connect to a service process of a server via a first client in the terminal device, and access one single game of a plurality of single games created by the server for a plurality of clients in response to opening instructions sent by the server, the plurality of single games sharing the service process and the service process including static resources and dynamic resources of the virtual scene, and the plurality of clients including the first client; a first receiving module 4552, configured to receive static resource masks sent by the server for the static resources, the static resource masks sent by the server to different clients being the same; and a second receiving module 4553, configured to receive dynamic resource masks sent by the server for the dynamic resources, the dynamic resource masks sent by the server to the clients accessing same single games being the same and the dynamic resource masks sent to the clients accessing different single games being different, and the static resource masks being used for sharing the static resources among the plurality of single games, and the dynamic resource masks being used for isolating the dynamic resources among the different single games.

In some embodiments, the isolating includes visual field isolation; and the data processing apparatus 455 for the virtual scene further includes: a request module, configured to send a dynamic resource update request to the server, the dynamic resource update request carrying operation information of the first client for the dynamic resources and dynamic resource masks allocated to the first client; and a third receiving module, configured to receive updated dynamic resources sent by the server, the server sending the updated dynamic resources to the first client and at least one client accessing a same single game and having a same field of view as the first client.

In some embodiments, the isolating includes physical isolation; and the data processing apparatus 455 for the virtual scene further includes: a fourth receiving module, configured to receive horizontal axis coordinates, longitudinal axis coordinates, and vertical axis coordinates allocated by server for dynamic resources within field of view of the first client, the server allocating, when positions of the dynamic resources within the field of view of the first client in the virtual scene coincide with positions of the dynamic resources within a field of view of a second client in the virtual scene and the single games accessed by the first client and the second client are different, same horizontal axis coordinates, longitudinal axis coordinates, and vertical axis coordinates for the dynamic resources within the field of view of the first client and the dynamic resources within the field of view of the second client.

The embodiments of this application provide a computer program product or computer program including computer instructions, the computer instructions being stored in a non-transitory computer-readable storage medium. A processor of a computer device reads the computer instructions from the computer-readable storage medium, and the processor executes the computer instructions to cause the computer device to execute the data processing method in a virtual scene described above in the embodiments of this application.

The embodiments of this application provide a non-transitory computer-readable storage medium storing therein executable instructions. The executable instructions, when executed by a processor, implement the data processing method foe a virtual scene provided by the embodiments of this application, for example, the data processing method for a virtual scene illustrated in FIG. 3A.

In some embodiments, the computer-readable storage medium may be a memory such as FRAM, ROM, PROM, erasable programmable read-only memory (EPROM), electrically erasable programmable read-only memory (EE-PROM), flash memory, magnetic surface storage, optical disk, or compact disc read-only memory (CD-ROM); or various devices including one or any combination of the above memories.

In some embodiments, the executable instructions may be written in any form of program, software, software module, script, or code, in any form of programming language, including compiled or interpreted languages, or declarative or procedural languages. They may be deployed in any form, including as stand-alone programs or as modules, assemblies, subroutines, or other units suitable for use in a computing environment.

As an example, the executable instructions may, but need not, correspond to files in a file system, may be stored in a portion of a file that holds other programs or data, for example, in one or more scripts in a hyper text markup language (HTML) document, in a single file dedicated to the program in question, or in multiple coordinated files (for example, files storing one or more modules, subroutines, or portions of code). In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

As an example, the executable instructions may be deployed to be executed on one computer device, or on a plurality of computer devices located at one site, or on a plurality of computer devices distributed across a plurality of sites and interconnected by a communication network.

In conclusion, the embodiments of this application have the following beneficial effects:
(1) On the one hand, by accessing the plurality of clients to the plurality of single games, and the plurality of single games sharing a service process, the number of service processes is significantly less than the number of single games, namely, the number of service processes is significantly reduced. Since the size of a memory occupied by static resources is positively related to the number of service processes, the significant reduction in the number of service processes significantly reduces the memory space occupation of the static resources, effectively reducing data redundancy. On the other hand, the plurality of single games share a service process; and by allocating corresponding static resource masks and dynamic resource masks to the clients in different single games, static resource sharing and dynamic resource isolation are realized among the plurality of single games. In this manner, dynamic resource isolation and static resource sharing among different single games may be achieved while effectively reducing data redundancy on the server.

(2) By setting an opening threshold and a closing threshold, when a plurality of clients access a plurality of single games, each single game is guaranteed to access by a certain number of clients, thereby realizing that the plurality of clients are connected to the plurality of single games. By accessing the plurality of clients to the plurality of single games, and the plurality of single games sharing a service process, the number of service processes is significantly less than the number of single games, namely, the number of service processes is significantly reduced. Since the size of a memory occupied by static resources is positively related to the number of service processes, the significant reduction in the number of service processes significantly reduces the memory space occupation of the static resources, effectively reducing data redundancy on the server.

(3) By allocating the same static resource masks corresponding to the static resources to each client, the static resources sent by the service process to each client is the same, realizing that all the clients among different single games share the same static resources, thus effectively avoiding the redundant loading of the static resources.

(4) Since clients accessing the same single game have the same dynamic resource masks, a target client which is the same as the dynamic resource masks of the first client may be determined based on the dynamic resource masks allocated to the first client, and the target client is determined to be a client accessing the same single game as the first client, so that the clients accessing the same single game are queried through the dynamic resource masks, facilitating the subsequent visual field isolation and physical isolation of dynamic resources for clients of different single games.

(5) At least one second client accessing the same single game and having the same field of view as the first client is determined from the two dimensions of the visual field distance threshold and the dynamic resource threshold, thus realizing the sharing of the dynamic resources between the first client and the second client, and realizing the isolation of the dynamic resource between the first client and the clients other than the second client.

(6) At least one second client accessing the same single game and having the same field of view as the first client is determined from the two dimensions of the visual field distance threshold and the dynamic resource threshold; when there is no second client satisfying the condition, the updated dynamic resources are sent only to the first client, thereby achieving isolation of the dynamic resources between the first client and clients other than the first client.

(7) By allocating the same horizontal axis coordinate, longitudinal axis coordinate, and vertical axis coordinate to the dynamic resources within the field of view of the first client and the dynamic resources within the field of view of the second client, the dynamic resources within the field of view of the first client and the dynamic resources within the field of view of the second client can completely overlap, thereby achieving physical isolation of the dynamic resources corresponding to the first client and the second client.

The above is only embodiments of this application and is not intended to limit the scope of protection of this application. Any modification, equivalent replacement, improvement, and the like made within the spirit and scope of this application shall be included in the scope of protection of this application.

What is claimed is:

1. A data processing method for a virtual scene performed by an electronic device, the method comprising:
   enabling a plurality of clients to access a plurality of single games via a service process;
   allocating static resource masks with a constant value to the plurality of clients;
   allocating dynamic resource masks with an iteratively incremental value of m to clients accessing an $m^{th}$ single game, m having a value range of $1 \le m \le M$, and M being an upper limit of the number of the single games that the service process can run;
   sharing the static resources among the plurality of single games based on the static resource masks corresponding to the static resources allocated to the plurality of clients; and
   isolating the dynamic resources among the plurality of single games based on the dynamic resource masks corresponding to the dynamic resources allocated to the plurality of clients.

2. The method according to claim 1, wherein the static resource masks allocated to the plurality of clients are the same, the dynamic resource masks allocated to the clients accessing same single games are the same and the dynamic resource masks allocated to the clients accessing different single games are different.

3. The method according to claim 1, wherein the enabling a plurality of clients to access a plurality of single games via a service process comprises:
   in response to the plurality of clients connecting to the service process, transmitting opening instructions to the plurality of clients, the opening instructions being used for the plurality of clients to connect to the plurality of single games,
   wherein each client connects to one single game, and the number of accesses to each single game is greater than or equal to an opening threshold and less than or equal to a closing threshold.

4. The method according to claim 1, wherein the isolating the dynamic resources among the plurality of single games based on the dynamic resource masks corresponding to the dynamic resources allocated to the plurality of clients comprises:
   receiving a dynamic resource update request transmitted by a first client of the plurality of clients, the dynamic resource update request carrying operation information of the first client for the dynamic resources and dynamic resource masks allocated to the first client;
   updating the dynamic resources based on the operation information to obtain updated dynamic resources;

determining, based on the dynamic resource masks allocated to the first client, at least one second client accessing a same single game and having a same field of view as the first client; and transmitting the updated dynamic resources to the first client and the at least one second client.

5. The method according to claim 1, wherein the isolating the dynamic resources among the plurality of single games based on the dynamic resource masks corresponding to the dynamic resources allocated to the plurality of clients comprises:

determining, when positions of the dynamic resources within a field of view of a first client in the virtual scene coincide with positions of the dynamic resources within a field of view of a second client in the virtual scene, a relationship of single games accessed by the first client and the second client based on the dynamic resource masks allocated to the first client and the second client, the first client and the second client being any two of the plurality of clients; and physically isolating the dynamic resources corresponding to the first client and the second client when the relationship characterizes that the single games accessed by the first client and the second client are different, the physically isolating being used for allocating same horizontal axis coordinates, longitudinal axis coordinates, and vertical axis coordinates for the dynamic resources within the field of view of the first client and the dynamic resources within the field of view of the second client.

6. The method according to claim 1, wherein the sharing the static resources among the plurality of single games based on the static resource masks corresponding to the static resources allocated to the plurality of clients comprises:

receiving a static resource request transmitted by one of the plurality of clients, the static resource request carrying the static resource masks; and querying, based on the static resource masks carried in the static resource request, that other clients in the plurality of clients are allocated with same static resource masks, determining that the plurality of clients share the static resources, and transmitting same static resources to the any one of the plurality of clients.

7. An electronic device, comprising:

a memory, configured to store executable instructions; and a processor, configured to implement, when executing the executable instructions stored in the memory, a data processing method for a virtual scene including:

enabling a plurality of clients to access a plurality of single games via a service process;

allocating static resource masks with a constant value to the plurality of clients;

allocating dynamic resource masks with an iteratively incremental value of m to clients accessing an $m^{th}$ single game, m having a value range of $1 \leq m \leq M$, and M being an upper limit of the number of the single games that the service process can run;

sharing the static resources among the plurality of single games based on the static resource masks corresponding to the static resources allocated to the plurality of clients; and isolating the dynamic resources among the plurality of single games based on the dynamic resource masks corresponding to the dynamic resources allocated to the plurality of clients.

8. The electronic device according to claim 7, wherein the static resource masks allocated to the plurality of clients are the same, the dynamic resource masks allocated to the clients accessing same single games are the same and the dynamic resource masks allocated to the clients accessing different single games are different.

9. The electronic device according to claim 7, wherein the enabling a plurality of clients to access a plurality of single games via a service process comprises:

in response to the plurality of clients connecting to the service process, transmitting opening instructions to the plurality of clients, the opening instructions being used for the plurality of clients to connect to the plurality of single games, wherein each client connects to one single game, and the number of accesses to each single game is greater than or equal to an opening threshold and less than or equal to a closing threshold.

10. The electronic device according to claim 7, wherein the isolating the dynamic resources among the plurality of single games based on the dynamic resource masks corresponding to the dynamic resources allocated to the plurality of clients comprises:

receiving a dynamic resource update request transmitted by a first client of the plurality of clients, the dynamic resource update request carrying operation information of the first client for the dynamic resources and dynamic resource masks allocated to the first client;

updating the dynamic resources based on the operation information to obtain updated dynamic resources;

determining, based on the dynamic resource masks allocated to the first client, at least one second client accessing a same single game and having a same field of view as the first client; and transmitting the updated dynamic resources to the first client and the at least one second client.

11. The electronic device according to claim 7, wherein the isolating the dynamic resources among the plurality of single games based on the dynamic resource masks corresponding to the dynamic resources allocated to the plurality of clients comprises:

determining, when positions of the dynamic resources within a field of view of a first client in the virtual scene coincide with positions of the dynamic resources within a field of view of a second client in the virtual scene, a relationship of single games accessed by the first client and the second client based on the dynamic resource masks allocated to the first client and the second client, the first client and the second client being any two of the plurality of clients; and physically isolating the dynamic resources corresponding to the first client and the second client when the relationship characterizes that the single games accessed by the first client and the second client are different, the physically isolating being used for allocating same horizontal axis coordinates, longitudinal axis coordinates, and vertical axis coordinates for the dynamic resources within the field of view of the first client and the dynamic resources within the field of view of the second client.

12. The electronic device according to claim 7, wherein the sharing the static resources among the plurality of single games based on the static resource masks corresponding to the static resources allocated to the plurality of clients comprises:

receiving a static resource request transmitted by one of the plurality of clients, the static resource request carrying the static resource masks; and querying, based on the static resource masks carried in the static resource request, that other clients in the plurality of clients are allocated with same static resource masks, determining that the plurality of clients share the static resources, and transmitting same static resources to the any one of the plurality of clients.

13. A non-transitory computer-readable storage medium storing executable instructions, the executable instructions, when executed by a processor of an electronic device, causing the electronic device to implement a data processing method for a virtual scene including:

enabling a plurality of clients to access a plurality of single games via a service process;

allocating static resource masks with a constant value to the plurality of clients;

allocating dynamic resource masks with an iteratively incremental value of m to clients accessing an $m^{th}$ single game, m having a value range of $1 \leq m \leq M$, and M being an upper limit of the number of the single games that the service process can run;

sharing the static resources among the plurality of single games based on the static resource masks corresponding to the static resources allocated to the plurality of clients; and isolating the dynamic resources among the plurality of single games based on the dynamic resource masks corresponding to the dynamic resources allocated to the plurality of clients.

14. The non-transitory computer-readable storage medium according to claim 13, wherein the static resource masks allocated to the plurality of clients are the same, the dynamic resource masks allocated to the clients accessing same single games are the same and the dynamic resource masks allocated to the clients accessing different single games are different.

15. The non-transitory computer-readable storage medium according to claim 13, wherein the enabling a plurality of clients to access a plurality of single games via a service process comprises:

in response to the plurality of clients connecting to the service process, transmitting opening instructions to the plurality of clients, the opening instructions being used for the plurality of clients to connect to the plurality of single games, wherein each client connects to one single game, and the number of accesses to each single game is greater than or equal to an opening threshold and less than or equal to a closing threshold.

16. The non-transitory computer-readable storage medium according to claim 13, wherein the isolating the dynamic resources among the plurality of single games based on the dynamic resource masks corresponding to the dynamic resources allocated to the plurality of clients comprises:

receiving a dynamic resource update request transmitted by a first client of the plurality of clients, the dynamic resource update request carrying operation information of the first client for the dynamic resources and dynamic resource masks allocated to the first client;

updating the dynamic resources based on the operation information to obtain updated dynamic resources;

determining, based on the dynamic resource masks allocated to the first client, at least one second client accessing a same single game and having a same field of view as the first client; and transmitting the updated dynamic resources to the first client and the at least one second client.

17. The non-transitory computer-readable storage medium according to claim 13, wherein the isolating the dynamic resources among the plurality of single games based on the dynamic resource masks corresponding to the dynamic resources allocated to the plurality of clients comprises:

determining, when positions of the dynamic resources within a field of view of a first client in the virtual scene coincide with positions of the dynamic resources within a field of view of a second client in the virtual scene, a relationship of single games accessed by the first client and the second client based on the dynamic resource masks allocated to the first client and the second client, the first client and the second client being any two of the plurality of clients; and physically isolating the dynamic resources corresponding to the first client and the second client when the relationship characterizes that the single games accessed by the first client and the second client are different, the physically isolating being used for allocating same horizontal axis coordinates, longitudinal axis coordinates, and vertical axis coordinates for the dynamic resources within the field of view of the first client and the dynamic resources within the field of view of the second client.

18. The non-transitory computer-readable storage medium according to claim 13, wherein the sharing the static resources among the plurality of single games based on the static resource masks corresponding to the static resources allocated to the plurality of clients comprises:

receiving a static resource request transmitted by one of the plurality of clients, the static resource request carrying the static resource masks; and querying, based on the static resource masks carried in the static resource request, that other clients in the plurality of clients are allocated with same static resource masks, determining that the plurality of clients share the static resources, and transmitting same static resources to the any one of the plurality of clients.

\* \* \* \* \*